US012558618B2

(12) United States Patent
Phillips et al.

(10) Patent No.: US 12,558,618 B2
(45) Date of Patent: Feb. 24, 2026

(54) 5G OPTIMIZED GAME RENDERING

(71) Applicant: Telefonaktiebolaget LM Ericsson (publ), Stockholm (SE)

(72) Inventors: Chris Phillips, Hartwell, GA (US); Per-Erik Brodin, Scotts Valley, CA (US); Robert Hammond Forsman, Jr., Sugar Hill, GA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 338 days.

(21) Appl. No.: 18/017,342

(22) PCT Filed: Jul. 20, 2020

(86) PCT No.: PCT/IB2020/056798
§ 371 (c)(1),
(2) Date: Jan. 20, 2023

(87) PCT Pub. No.: WO2022/018483
PCT Pub. Date: Jan. 27, 2022

(65) Prior Publication Data
US 2024/0033624 A1      Feb. 1, 2024

(51) Int. Cl.
$A63F$ $13/355$ (2014.01)
$A63F$ $13/332$ (2014.01)
$A63F$ $13/358$ (2014.01)

(52) U.S. Cl.
CPC .......... *A63F 13/355* (2014.09); *A63F 13/332* (2014.09); *A63F 13/358* (2014.09); *A63F 2300/538* (2013.01); *A63F 2300/8082* (2013.01)

(58) Field of Classification Search
CPC .... A63F 13/355; A63F 13/332; A63F 13/358; H04N 13/344; H04N 19/597; H04L 67/131
See application file for complete search history.

(56) References Cited

U.S. PATENT DOCUMENTS

| | | | |
|---|---|---|---|
| 10,083,538 | B2 | 9/2018 | Li |
| 10,432,970 | B1 | 10/2019 | Phillips et al. |
| 10,650,590 | B1 * | 5/2020 | Topiwala ................ H04L 67/61 |
| 2013/0249947 | A1 | 9/2013 | Reitan |

(Continued)

FOREIGN PATENT DOCUMENTS

| | | |
|---|---|---|
| WO | 2017205794 A9 | 11/2017 |
| WO | 2018175855 A1 | 9/2018 |
| WO | 2019120638 A1 | 6/2019 |

*Primary Examiner* — Yingchuan Zhang

(57) ABSTRACT

According to some embodiments, a method performed by a virtual environment rendering engine for remote rendering of a virtual environment for a client device comprises: receiving an indication of network latency between the virtual environment rendering engine and the client device; receiving an indication of a client viewport field of view for the client device; based on the network latency, determining an adjusted viewport field of view; and generating a projection mapped 360 degree video frame. The pixel density within the adjusted viewport field of view is greater than the pixel density outside the adjusted viewport field of view. The method further comprises encoding the projection mapped 360 degree video frame and transmitting the encoded projection mapped 360 degree video frame to the client device.

12 Claims, 30 Drawing Sheets

(56)                References Cited

U.S. PATENT DOCUMENTS

| | | | |
|---|---|---|---|
| 2019/0238609 A1* | 8/2019 | Skupin | H04N 21/8456 |
| 2019/0281318 A1 | 9/2019 | Han et al. | |
| 2020/0077124 A1 | 3/2020 | Shi et al. | |
| 2021/0407214 A1* | 12/2021 | Le Roux | G06T 19/003 |

* cited by examiner

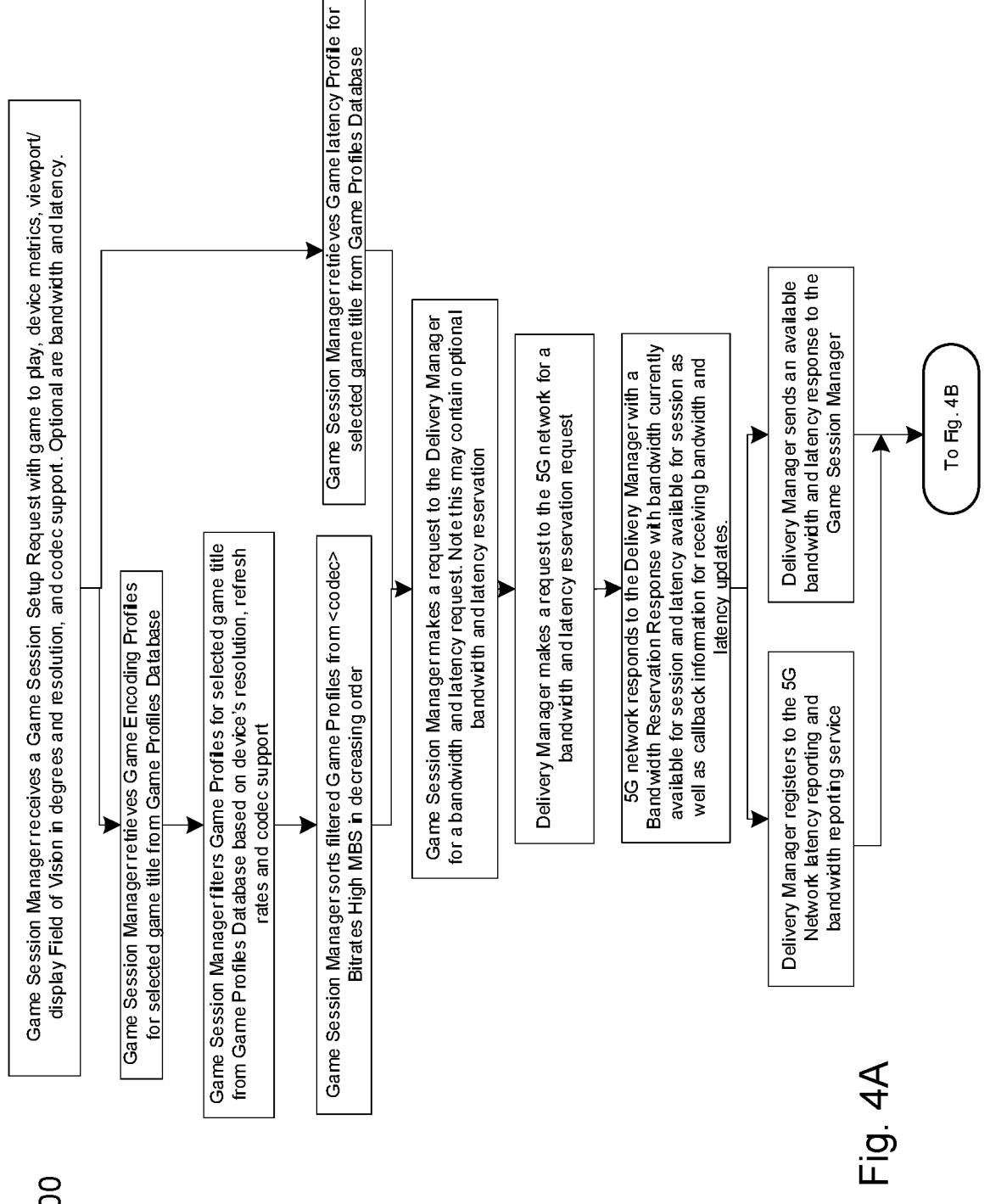

400

Game Session Manager receives a Game Session Setup Request with game to play, device metrics, viewport/display Field of Vision in degrees and resolution, and codec support. Optional are bandwidth and latency.

Game Session Manager retrieves Game Encoding Profiles for selected game title from Game Profiles Database Game Session Manager filters Game Profiles for selected game title from Game Profiles Database based on device's resolution, refresh rates and codec support Game Session Manager sorts filtered Game Profiles from <codec> Bitrates High MBS in decreasing order Game Session Manager retrieves Game latency Profile for selected game title from Game Profiles Database Game Session Manager makes a request to the Delivery Manager for a bandwidth and latency request. Note this may contain optional bandwidth and latency reservation Delivery Manager makes a request to the 5G network for a bandwidth and latency reservation request 5G network responds to the Delivery Manager with a Bandwidth Reservation Response with bandwidth currently available for session and latency available for session as well as callback information for receiving bandwidth and latency updates.

Delivery Manager registers to the 5G Network latency reporting and bandwidth reporting service Delivery Manager sends an available bandwidth and latency response to the Game Session Manager To Fig. 4B

| Resolution | Frame Rate | HEVC Bitrate Low Mbs | HEVC Bitrate High Mbs | VVC Bitrate Low Mbs | VVC Bitrate High Mbs | Games List |
|---|---|---|---|---|---|---|
| 8K | 120 Hz | 230 | 270 | 115 | 135 | Raw Data, Battle Field 10, Call of Duty MW 14, Roller Coaster Battle 3, Mortal Combat 14 |
| 8K | 90 Hz | 180 | 230 | 90 | 115 | Raw Data, Battle Field 10, Call of Duty MW 14, Roller Coaster Battle 3, Mortal Combat 14 |
| 8K | 60 HZ | 145 | 180 | 72.5 | 90 | Raw Data, Battle Field 10, Call of Duty MW 14, Roller Coaster Battle 3, Mortal Combat 14 |
| 8K | 30 Hz | 115 | 145 | 57.5 | 72.5 | Roller Coaster Battle 3, Mortal Combat 14, Call of Duty MW 14, Roller Coaster Battle 3, Mortal Combat 14 |
| 4K | 120 Hz | 120 | 150 | 63 | 78.5 | Raw Data, Battle Field 10, Call of Duty MW 14, Roller Coaster Battle 3, Mortal Combat 14 |
| 4K | 90 Hz | 90 | 120 | 47.25 | 63 | Raw Data, Battle Field 10, Call of Duty MW 14, Roller Coaster Battle 3 |
| 4K | 60 HZ | 55 | 90 | 28.8 | 47.25 | Raw Data, Battle Field 10, Call of Duty MW 14, Roller Coaster Battle 3 |
| 4K | 30 Hz | 35 | 55 | 18.375 | 28 | Roller Coaster Battle 3, Mortal Combat 14, Roller Coaster Battle 3, Mortal Combat 14 |
| 1080P | 120 Hz | 60 | 75 | 33 | 41.25 | Mortal Combat 11, Battle Field 2, Battle Field 1, Call of Duty WWII, Roller Coaster Battle 3, Mortal Combat 14 |
| 1080p | 90 Hz | 35 | 60 | 19.25 | 33 | Mortal Combat 11, Battle Field 2, Battle Field 1, Call of Duty WWII, Roller Coaster Battle 3, Mortal Combat 14 |
| 1080p | 60 Hz | 16 | 35 | 8.8 | 19.25 | Mortal Combat 11, Battle Field 2, Battle Field 1, Call of Duty WWII, Roller Coaster Battle 3, Mortal Combat 14 |
| 1080p | 30 Hz | 8 | 16 | 4.4 | 8.8 | Mortal Combat 11, Battle Field 2, Battle Field 1, Call of Duty WWII, Roller Coaster Battle 3, Mortal Combat 14 |
| 720p | 120 Hz | 13 | 16 | 7.8 | 9.6 | Mortal Combat 11, Battle Field 2, Battle Field 1, Call of Duty WWII |
| 720p | 90 Hz | 10 | 13 | 6 | 7.8 | Mortal Combat 11, Battle Field 2, Battle Field 1, Call of Duty WWII |
| 720p | 60 HZ | 7 | 10 | 4.2 | 6 | Mortal Combat 11, Battle Field 2, Battle Field 1, Call of Duty WWII |
| 720p | 30 Hz | 4 | 7 | 2.4 | 4.2 | Mortal Combat 11, Battle Field 2, Battle Field 1, Call of Duty WWII |

Fig. 5

| High Latency Limit | Games List |
|---|---|
| 10 ms | Raw Data, Battle Field 10, Call of Duty MW 14, Roller Coaster Battle 3, Mortal Combat 10, Mortal Combat 14 |
| 20 ms | Mario Brothers, Mario World 2, Kings Quest 3, Kings Quest 4, Donky Kong Country, Battle Royal, God of War iV |
| 25 ms | Rainbow Six Seige. Grand Theft Auto V. Fortnite. Minecraft, World of warcraft |
| 30 ms | Madden NFL, NBA 2K16, Sports Champions, Silent Hunter |
| 40 ms | Flight Simulator 6, Demon Hunter |
| 50 ms | SHADOW OF CHERNOBYL, NIER AUTOMATA, HORIZON ZERO DAWN, WASTELAND 2 |
| 60 ms | ALPHA PROTOCOL, FALLOUT 2, MASS EFFECT, SYSTEM SHOCK 2 |

900 texture map

2000

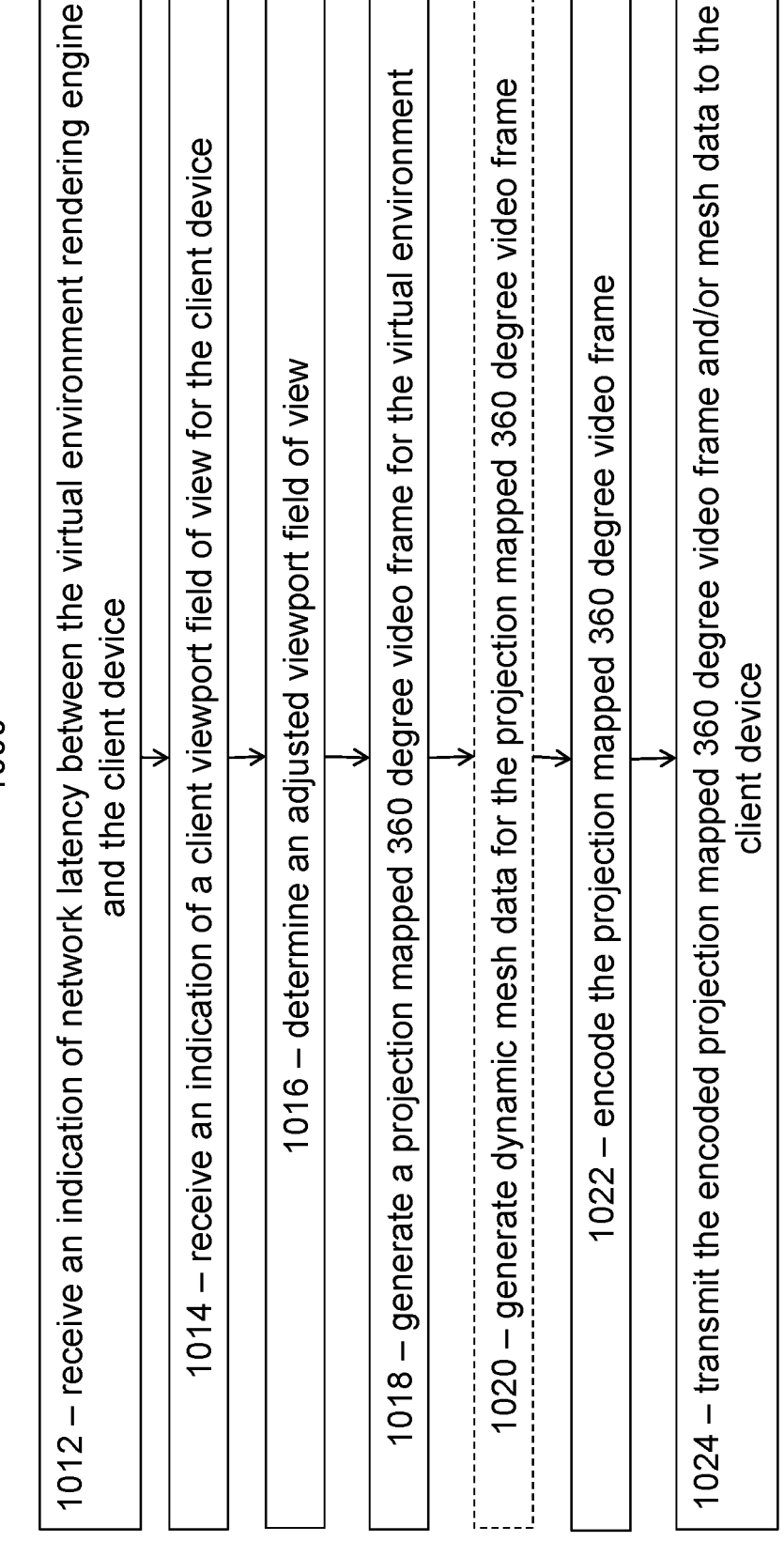

1000

1012 – receive an indication of network latency between the virtual environment rendering engine and the client device 1014 – receive an indication of a client viewport field of view for the client device 1016 – determine an adjusted viewport field of view 1018 – generate a projection mapped 360 degree video frame for the virtual environment 1020 – generate dynamic mesh data for the projection mapped 360 degree video frame 1022 – encode the projection mapped 360 degree video frame 1024 – transmit the encoded projection mapped 360 degree video frame and/or mesh data to the client device

Fig. 22

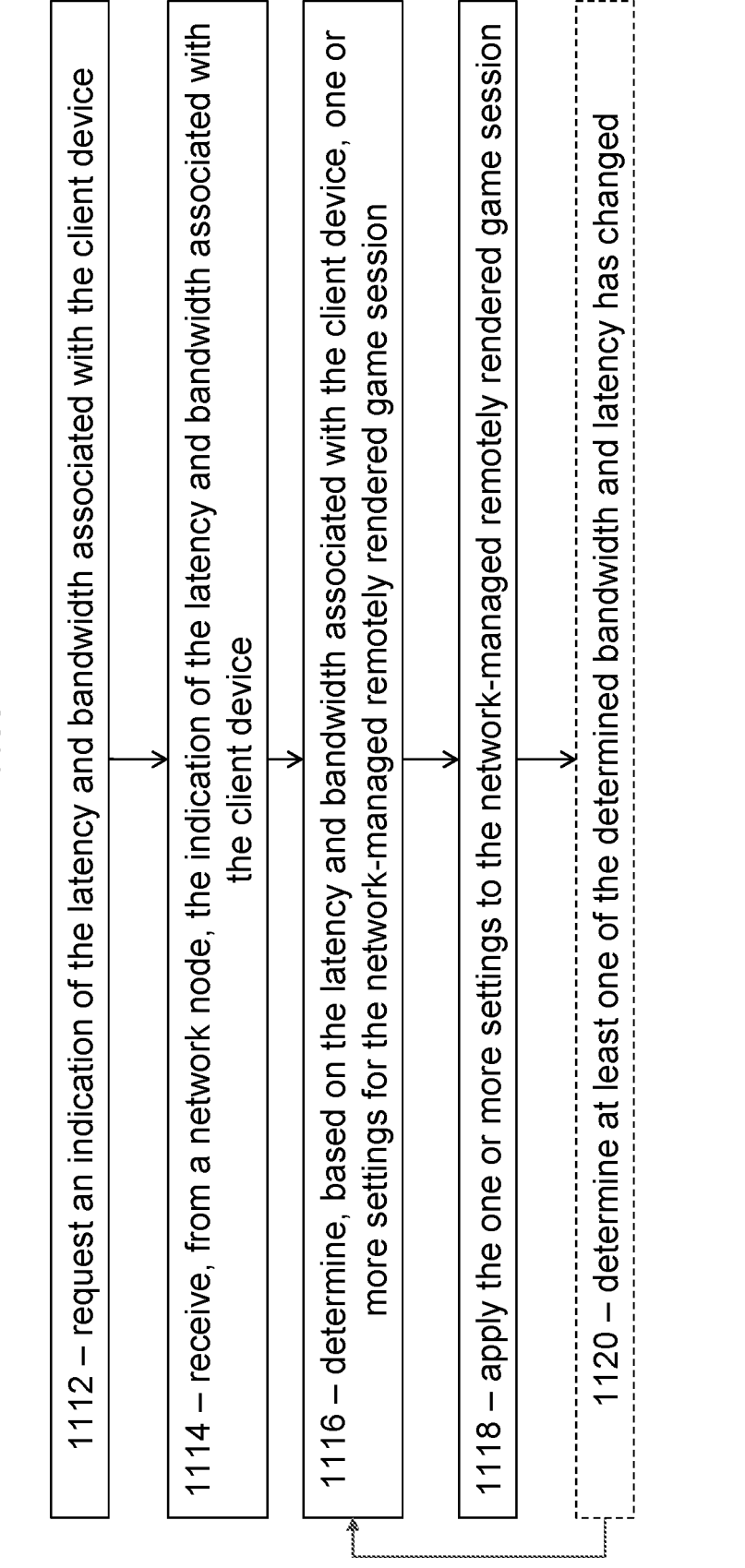

1100

1112 – request an indication of the latency and bandwidth associated with the client device 1114 – receive, from a network node, the indication of the latency and bandwidth associated with the client device 1116 – determine, based on the latency and bandwidth associated with the client device, one or more settings for the network-managed remotely rendered game session 1118 – apply the one or more settings to the network-managed remotely rendered game session 1120 – determine at least one of the determined bandwidth and latency has changed

Fig. 23

5G OPTIMIZED GAME RENDERING

RELATED APPLICATIONS

This application is a national phase application of International Patent Application No. PCT/IB2020/056798, filed Jul. 20, 2020, the disclosure of which is hereby incorporated herein by reference in its entirety.

TECHNICAL FIELD

Particular embodiments relate to remote game rendering, and more specifically to fifth generation (5G) optimized remote game rendering.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Remote game rendering, also referred to as cloud gaming, is gaining traction by game studios, internet companies and network operators. Current products on the market (e.g., Google's Stadia, Sony's PS Now, etc.) offer remote game streaming and download as a business. Download refers to downloading the game to the local hard drive where the game runs locally on the gaming console or personal computer (PC). Streaming refers to running the game (e.g., executing, rendering, and encoding) somewhere in the network and receiving the output of the rendered game (e.g., a stream) on a client device. The controller input is consumed on the local device and delivered over the network to the remotely running game engine.

Like adaptive video streaming over unmanaged networks, the gaming providers attempt to adapt to changes in bandwidth over unmanaged networks, however the adaptation is different than adaptive bitrate (ABR) video streaming. In ABR video streaming, the content is encoded at multiple bitrates with a manifest generated representing the playlist of video segments across multiple bitrates. The client device typically buffers three segments of the manifest playlist. If the segments are ten seconds long, then the client has a thirty second buffer. As the client downloads a particular bitrate segment, the client measures the time for the download. If the download is within an upper threshold of the encoded bitrate, the client will drop in bitrate and quality for the segment or next segment to download. If the download is within a lower threshold of the encoded bitrate, the client will increase in bitrate and quality for the segment or next segment to download.

For remote gaming, typical ABR video streaming methods are not acceptable. First, the client device can only buffer a very small amount of video and audio data. Running with anything other than an extremely small buffer will cause the latency to be too high for gaming, making the game unplayable. Second, each gaming session must have its own encoding. Each session (e.g., user/player at a client device) in the game has its own game dynamics and the same encoded video and audio cannot be shared. This means each rendered game session must be encoded, delivered and decoded on a one-to-one basis. The adaptation in bandwidth is made by the server with the client attempting to get an estimate in bandwidth and dynamically adjust the encoded video, audio and haptics bitrate to fit inside of the estimated bandwidth allocation. To prevent imposing too much latency, the encoding must be extremely fast, the network latency must be low, and the client must run with an extremely small buffer—however, the existence of such conditions can be challenging to achieve, as explained in more detail below.

With the upcoming release and expansion of fifth generation (5G) mobile networks with the advantage of higher bandwidth and lower latency, companies are eager to offer remote gaming services over the 5G mobile network.

There currently exist certain challenges. For example, in a perfect network environment, remote gaming can offer an adequate quality of experience (QoE) to the user. Testing in less than perfect conditions with changes in bandwidth and latency, the gaming systems suffer major hits to the quality of experience and render the games unplayable. Because the client device runs with an extremely small buffer, sudden changes in bandwidth cause the client device to deplete the buffer and the game becomes unplayable until the remote gaming system can adjust to compensate for the loss in bandwidth. In remote gaming, a side effect, for example, is that it may cause a player's character to suffer or die as a result of fighting enemies in the gameplay.

Another problem is when frames have to get retransmitted as a result of the client requesting a new Intra frame. Intra frames are extremely expensive to deliver in terms of bandwidth. When running at higher framerates such as 60 frames per second and a frame is dropped or assumed as dropped as a result in a sudden loss in bandwidth, the client requests an Intra frame (also referred to as an "I frame") to be generated. If the bitrate is too high to deliver the I frame in time, this causes a compounding problem making the game totally unplayable until the system can properly adjust to the new bandwidth.

High latency is another problem in remote rendering and cloud gaming. For non-virtual reality (non-VR) gaming, high latency is another problem that can affect the quality of experience in remote game rendering. For non-VR game rendering, high roundtrip latency can affect what the user sees on the screen in response to the movements made through the controller as well as, for example, the enemies the user is combatting. If the latency is high, the gamer will suffer, for example, a loss or in-game death as a result of not seeing the opponent in time. Low latency is critical for gameplay when the game is rendered locally, and the user is playing against remote users. For remote rendering it is even more critical because all movements and in-game control must be sent from the local game controller to the network. The game engine processes the movements and actions, outputs the rendered video, audio and haptics, encodes, transmits, decodes and renders the video, audio and haptics locally.

For remote VR gaming, all of the above problems exist and includes additional problems. The user wears an immersive VR headset. Where the user is looking in the headset is tracked. When the user moves their body or neck, the view inside of the headset changes. For the user to feel they are in the proper presence, the game must achieve a low motion-to-photon latency. The human eye must perceive accurate and smooth movements with low motion-to-photon latency. Motion-to-photon latency is the lapse between the moment the head and body movement occurs and the video update corresponding to the new head movement. Based on multiple studies, for VR it has been widely accepted in the industry that a target of motion to photon latency must be <20 ms to significantly reduce the probability of nausea or motion sickness. More information can be found at www-.chioka.in/what-is-motion-to-photon-latency/.

In VR, sensors detect where the user is looking and track head and body movements. The movements are sent to the gaming engine and the video rendered in the headset is adjusted to where the user is looking in the 360 degree VR space. Typically, in local rendered video, high latencies for making these adjustments is caused by lack of processing power. As stated earlier for non-VR gaming, there are several areas which can affect latency. A difference in VR gaming versus non-VR gaming is how the view into the 360 space is controlled. For non-VR gaming, this is controlled by the game controller. For personal computers (PCs), the game controller may be the mouse, keyboard, game pad/ controller or joystick. For VR gaming, the view into the 360 degree space is controlled by the sensors detecting where the user's head is looking and is controlled by moving the head or body. This latency should be less than 20 ms from sensor detection sent to the remote gaming engine, the gaming engine adjusting for the new view, rendering the video, encoding, transmitting, client device decoding and rendering to avoid nausea/motion sickness.

When bandwidth is low and/or latency is high, the user may experience problematic symptoms such as losing the video in the headset, slow updates of video inside of the headset, and stuttering video.

SUMMARY

Based on the description above, certain challenges currently exist with remote game rendering over wireless networks. Certain aspects of the present disclosure and their embodiments may provide solutions to these or other challenges. For example, particular embodiments optimize remote rendering for virtual reality (VR) and non-VR gaming using 360 degree video.

According to some embodiments, a method performed by a virtual environment rendering engine for remote rendering of a virtual environment for a client device comprises: receiving an indication of network latency between the virtual environment rendering engine and the client device; receiving an indication of a client viewport field of view for the client device; based on the network latency, determining an adjusted viewport field of view; and generating a projection mapped 360 degree video frame. When the projection mapped 360 degree video frame is rendered in the virtual environment, a pixel density within the adjusted viewport field of view is greater than a pixel density outside the adjusted viewport field of view. The method further comprises encoding the projection mapped 360 degree video frame and transmitting the encoded projection mapped 360 degree video frame to the client device.

In particular embodiments, the adjusted viewport field of view increases in dimension as the network latency increases.

In particular embodiments, the method further comprises generating dynamic mesh data for the projection mapped 360 degree video frame and transmitting the dynamic mesh data to the client device.

In particular embodiments, the projection mapped 360 degree video frame comprises an equiangular box comprising a front, back, top, bottom, and two sides, and the method further comprises orienting the front of the equiangular box with the client viewport field of view for the client device. The pixel density of the front of the equiangular box may be greater than the pixel density of each of the top, bottom, two sides, and back of the equiangular box.

In particular embodiments, the virtual environment rendering engine comprises a game rendering engine and the client device comprises one or more of a virtual reality headset and a video display screen. The network between the virtual environment rendering engine and the client device may comprises a fifth generation (5G) wireless network, and the indication of network latency may be received from a 5G network node.

According to some embodiments, a virtual environment rendering engine comprises processing circuitry operable to perform any of the virtual environment rendering engine methods described above.

According to some embodiments, a method in a virtual environment rendering support node for supporting a network-managed remotely rendered game session comprises: requesting, prior to establishing or during a network-managed remotely rendered game session for display on a client device, an indication of the latency and bandwidth associated with the client device; receiving, from a network node, the indication of the latency and bandwidth associated with the client device; determining, based on the latency and bandwidth associated with the client device, one or more settings for the network-managed remotely rendered game session; and applying the one or more settings to the network-managed remotely rendered game session.

In particular embodiments, the method further comprises determining at least one of the determined bandwidth and latency has changed, updating the one or more settings for the network-managed remotely rendered game session, and applying the updated one or more settings to the network-managed remotely rendered game session.

In particular embodiments, the one or more settings for the network-managed remotely rendered game session comprise one or more of encoding parameters, framerate, resolution, and field of view.

According to some embodiments, a virtual environment rendering support node comprises processing circuitry operable to perform any of the virtual environment rendering support node methods described above.

Also disclosed is a computer program product comprising a non-transitory computer readable medium storing computer readable program code (e.g., instructions), the computer readable program code operable, when executed by processing circuitry to perform any of the methods performed by the virtual environment rendering engine described above.

Another computer program product comprises a non-transitory computer readable medium storing computer readable program code, the computer readable program code operable, when executed by processing circuitry to perform any of the methods performed by the virtual environment rendering support node described above.

Certain embodiments may provide one or more of the following technical advantages. For example, particular embodiments solve the bandwidth and latency problems described above for both non-VR and VR remote game rendering. Particular embodiments are directed toward 5G networks, however, they could be applied to any network provided the network can give proper feedback for remote gaming encoding and delivery optimization.

Some embodiments provide hooks from the network into the low latency adaptive encoding system enabling the video encoder to receive faster updates on bandwidth conditions facilitating faster adjustments. This enables the client device to run with a smaller buffer and still provide continuous decoding of the video frames because the frames have a higher probability of arriving in time.

Some embodiments improve video quality using an adaptive projection remapping system which directs a higher pixel density to the headset and reduces pixel density outside of the headset. Some embodiments use an adaptive projection mapping system, where adaptive adjustments are made based on how wide the higher density used outside of the headset point of view. For extreme low latency, the density may be much greater inside of the headset. As latency increases, the adaptive projection map adjusts farther out beyond the headset point of view based on the amount of latency incurred. Even with higher latency, the quality inside of the headset is higher than using standard projection mapping and evenly placing the pixel density across the entire 360 degree video space. The expansion beyond the headset point of view enables head movement changes to occur without moving beyond the higher quality area.

BRIEF DESCRIPTION OF THE DRAWINGS

For a more complete understanding of the disclosed embodiments and their features and advantages, reference is now made to the following description, taken in conjunction with the accompanying drawings, in which:

FIGS. 4A-4D comprise a flow diagram of an example method in a remote virtual environment rendering system;

FIG. 5 is a table representing small-scale example of a database of resolutions, frame rates, bitrate ranges for two different types of codecs supports as well as the game title requirements;

FIG. 6 is table representing a small-scale example of a database of latency limits for game title requirements;

FIG. 22 is flowchart illustrating an example method performed by a virtual environment rendering engine for remote rendering of a virtual environment for a client device, according to certain embodiments; and FIG. 23 is a flowchart illustrating an example method in a virtual environment rendering support node for supporting a network-managed remotely rendered game session, according to certain embodiments.

DETAILED DESCRIPTION

As described above, certain challenges currently exist with remote game rendering over wireless networks. Certain aspects of the present disclosure and their embodiments may provide solutions to these or other challenges. For example, particular embodiments optimize remote rendering for virtual reality (VR) and non-VR gaming using 360 degree video.

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Figure 1:
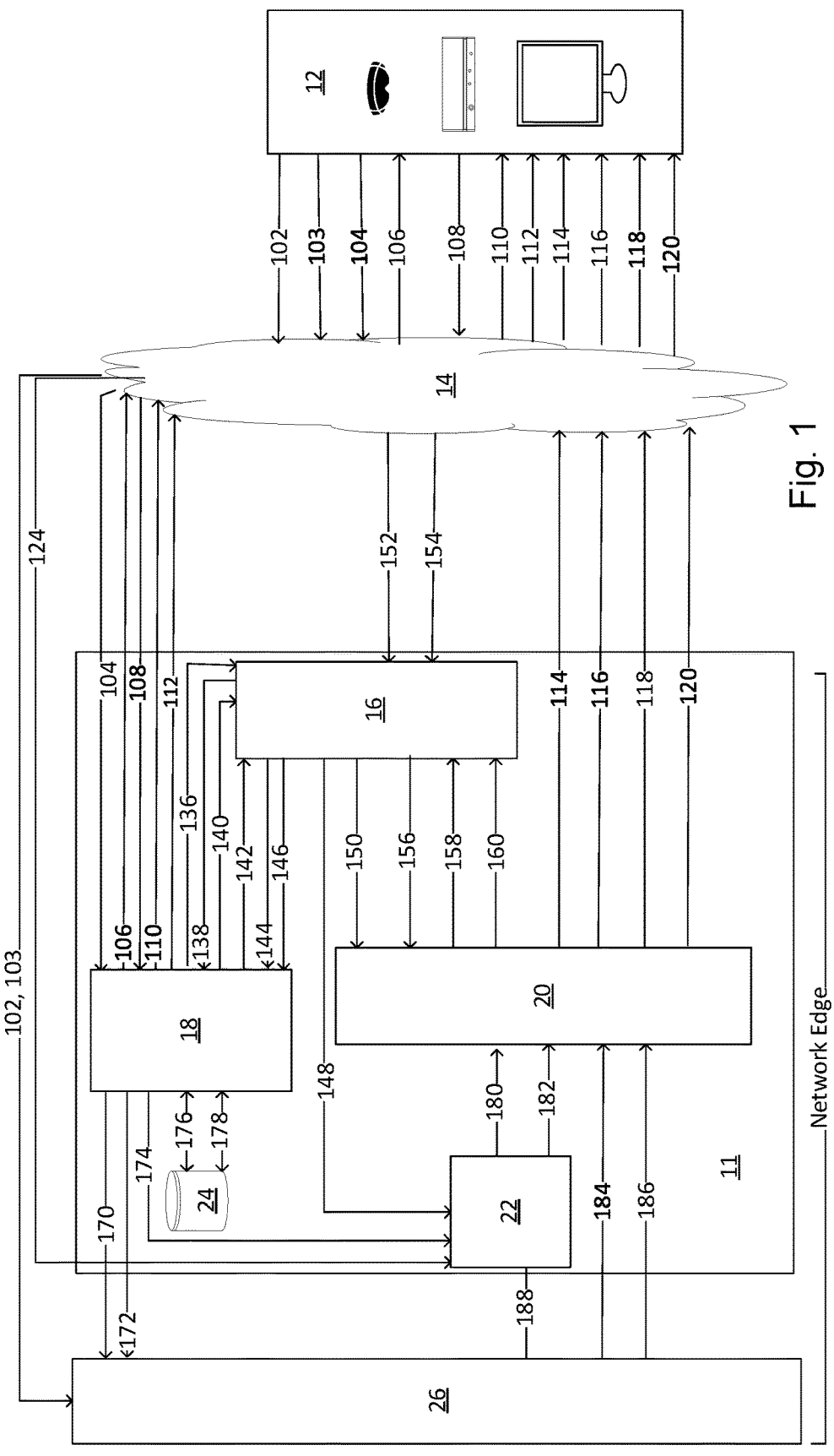
FIG. 1 is a block diagram illustrating the architecture of a remote virtual environment rendering system, according to some embodiments.

FIG. 1 is a block diagram illustrating the architecture of a remote virtual environment rendering system, according to some embodiments. Remote virtual environment rendering system 10 includes virtual environment rendering engine 11 for remote rendering of a virtual environment, client device 12 for display of and interacting with the virtual environment, wireless network 14, and session engine 26.

Client device 12 may comprise a virtual reality headset, game console, computer, laptop, tablet, smartphone, or any other suitable client device for displaying and/or interacting with a virtual environment.

Virtual environment rendering engine 11 comprises delivery manager 16, session manager 18, low latency adaptive video and audio encoder with haptics and mesh delivery subsystem 20, adaptive projection remapping subsystem 22, and database 24.

In the illustrated architecture, wireless network 14 provides low latency bandwidth reporting and latency reporting to adaptive projection remapping subsystem 22 and low latency adaptive video and audio encoder with haptics and mesh delivery subsystem 20. The expectation for virtual environments, such as first person shooter and third person shooter games as well as other VR games, is that session engine 26 renders the video covering 360 degrees. An advantage of delivering the video as the full 360 degrees removes the processing and network latency to meet the 20 ms end to end latency for the motion-to-photon requirement to avoid motion sickness.

The full 360 degree video is sent to client device 12 as encoded video and it is decoded and rendered locally.

Sending the full 360 degree video requires more bandwidth. To reduce the bandwidth requirement for the full 360 degree video, particular embodiments use foveated rendering with custom projection mapping to provide a higher density of pixels to client device 12 for pixels inside the user field of view and lowering the density of pixels outside of the user field of view. Based on changing latencies and bandwidth, the remapping subsystem adapts and increases the area of higher concentration of pixels beyond the user field of view to prevent the user from making rapid point of view movements and leaving the higher density area.

Session manager may store session encoding profiles 176 and session latency profiles 178 in database 24.

Session manager 18 receives session setup request 104 such as a game setup request, from client device 12. In some embodiments, session setup request 104 may include a selected game to play and device information such as headset or display resolution, degree field of vision of the headset and device's processing capabilities. Session manager 18 may also receive a requested bandwidth and latency reservation.

Session manager 18 starts session engine 26 with, for example, the selected game 170 to play and requests a resolution 172 for the session. The resolution is controlled based on device capabilities and available bandwidth. Based on changes in bandwidth, the resolution may change during the session.

The resolution may be controlled directly from the encoder, however, reducing the rendered resolution from session engine 26 may reduce the computing requirements required to run session engine 26. Session manager 18 may make a bandwidth and latency request 136 to delivery manager 16 and receive bandwidth and latency response 138. If the bandwidth and latency reservation request cannot be met, session manager 18 may respond to client device 12 with the available bandwidth and latency the network can provide for the session at session setup time in session setup response 106. A game application developer, for example, can choose to refuse the request because the gaming quality of experience (QoE) may not be good enough for the game genre. The application game developer may provide feedback to the user and let the user determine whether to continue to play the game. For example, client device 12 may send continue session response anyway 108 to session manager 18. The previous two options are examples, and there are other options not described herein.

Delivery manager 16 receives filtered session encoding profiles 140 from session manager 18. Filtered session encoding profiles 140 are used to control the encoding parameters such as resolution and codec support optimized based on the display and performance characteristics of client device 12.

Delivery manager 16 makes a request to wireless network 14 (e.g., a 5G network) for a bandwidth and latency reservation for bandwidth and requested network latency. This may be the bitrate and optimal latency received from the session manager 18 for the optimal gaming experience as defined by the game developer.

Depending on network conditions, the reported bandwidth 154 and reported latency 152 from wireless network 14 may be the requested bandwidth and/or latency, or it may be the amount of bandwidth and/or latency currently allocated/available for the session. The response also contains callback information for wireless network 14 to provide changes in bandwidth and latency.

Based on the reported bandwidth from wireless network 14, delivery manager 16 may send low bandwidth notification 144 or high latency notification 146 to session manager 18.

Delivery manager 16 receives the haptics bitrate 158 and the and the rendering mesh data bitrate 160 from low latency adaptive video and audio encoder with haptics and mesh delivery subsystem 20. Because there is no compression for haptics and mesh data, the bitrates cannot change, however, the bitrates are considered when delivery manager 16 calculates the optimal video and audio bitrates for video and audio encoding based on the current bandwidth available.

Based on changes in bandwidth, low latency adaptive video and audio encoder with haptics and mesh delivery subsystem 20 receives the audio encoding bitrate 156 and optimal encoding parameters 150 from delivery manager 16. Some optimal encoding parameters are encoding bitrate, framerate and resolution which are determined based on game, device capabilities and codec as well as available bandwidth.

Delivery Manager 16 sends bandwidth and latency report 148 to adaptive projection remapping subsystem 22 for viewport and quality optimizations based on changing network conditions.

Some examples of headset orientation are quaternion or orientation matrix, however particular embodiments are not limited to these. Particular embodiments reference the headset orientation as the data being transmitted from the client to the server for the viewport.

Adaptive projection remapping subsystem 22 adapts the pixel density to be more concentrated in the headset view to optimize the quality based on a given bandwidth and latency. Adaptive projection remapping subsystem 22 may receive the device viewport field of vision 174 in degrees. The device viewport field of view is used to properly create the projection map to give the highest pixel density in an area to cover the viewport.

Adaptive projection remapping subsystem 22 receives the headset orientation 124 as input and adjusts the view of the projection map causing the highest density of pixels to always be inside of the headset view as the user changes gaze. Based on changes in bandwidth and latency 148 received from delivery manager 16, the pixel density may be expanded beyond the viewport of the headset. As latencies increase, adaptive projection remapping subsystem 22 expands the higher density of pixels farther out from viewport. This prevents the user from changing head position and moving beyond the higher density pixels before adaptive projection remapping subsystem 22 can rotate the high-quality view to the new head position. In addition, depending on the device metrics, as bitrate increases, encoding bitrate, resolution and frames per second can be increased enabling an expanded high-quality area.

For client device 12 to properly render the adaptive projection map, mesh data 118 is sent to client device 12 for client device 12 to properly render the projection mapped data. Dynamic mesh data 118 is sent anytime a user changes view. This could be sent with every frame or to save network resources, it could be sent anytime a user changes their view. This enables bandwidth savings because mesh data is sent when a user changes the viewport or network conditions result in a change in the projection remap. Particular embodiments include mesh data transmission only on headset orientation changes or remapping changes based on bandwidth and latency changes.

Low latency adaptive video and audio encoder with haptics and mesh delivery subsystem 20 receives the encoding parameters 150, 156 from delivery manager 16. The encoding bitrates are delivered in extreme low latency from delivery manager 16 based on bitrate changes reported from wireless network 14, otherwise client device 12 suffers a loss in frames, which may result, for example, in an unacceptable or unplayable game experience. The video bitrate is guaranteed to fit the encoded video in the available bandwidth along with the audio encoding, haptics and mesh data.

The audio encoder receives the available bandwidth and adjust the encoding bitrates before client device 12 suffers a loss in frames which may result in, for example, an unacceptable game experience. The audio bitrate is guaranteed to fit the encoded audio in the available bandwidth along with the video encoding, haptics data and mesh data.

Session engine 26 receives the in-game control 102 and headset orientation 103 data from client device 12 over wireless network 14. Session engine 26 adjusts the view and the session dynamics based on the incoming data.

Low latency adaptive video and audio encoder with haptics and mesh delivery subsystem 20 measures the haptics data bandwidth and sends haptics bitrate 158 to delivery manager 16.

Although particular functions are illustrated as separate boxes/nodes for ease of description, in some embodiments any one or more of the functions may be combined or distributed. For example, in some embodiments low latency adaptive video and audio encoder with haptics and mesh delivery subsystem 20 operations may be performed directly inside of session engine 26.

Figure 2:
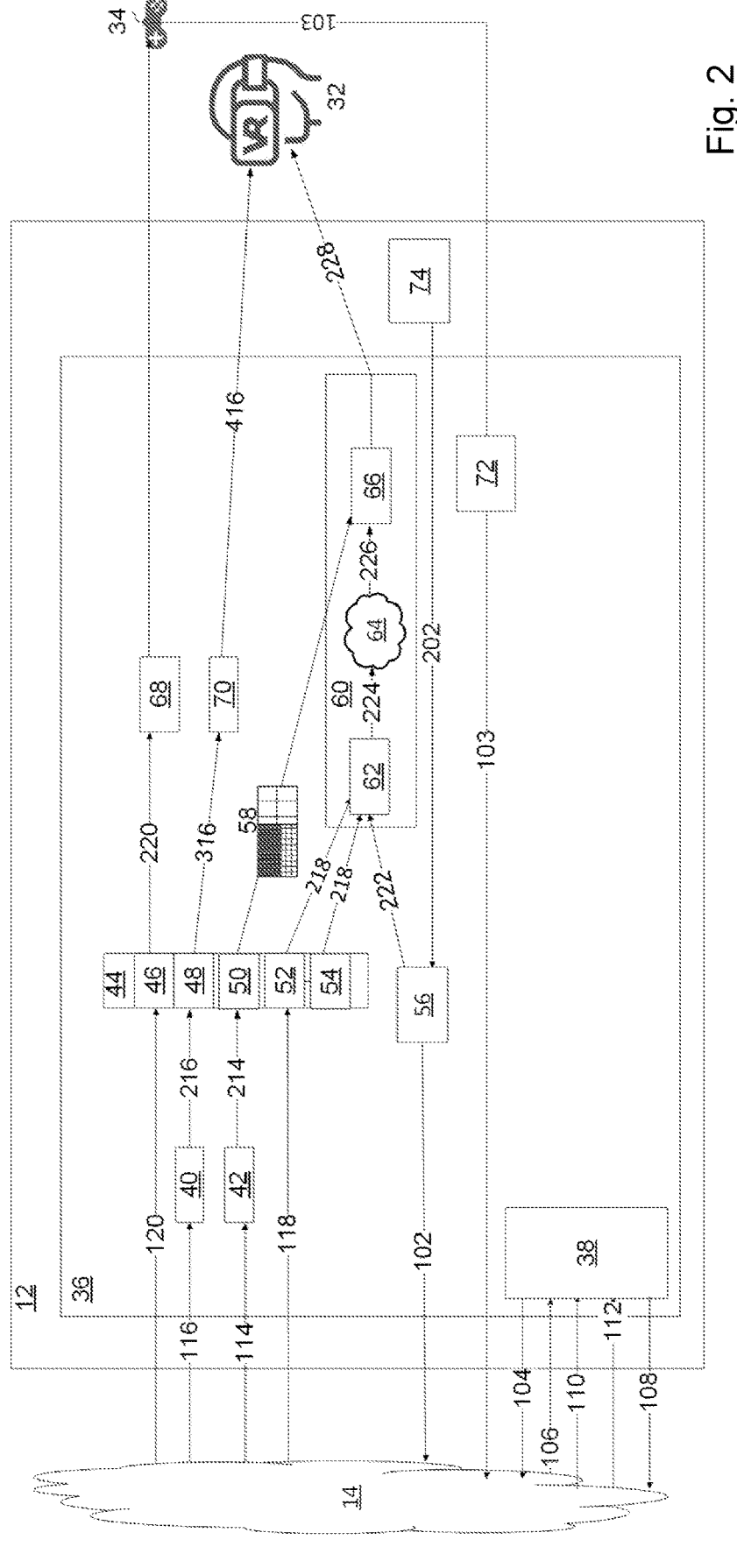
FIG. 2 is a block diagram illustrating the architecture of a client device, according to some embodiments.

FIG. 2 is a block diagram illustrating the architecture of a client device, according to some embodiments. Client device 12 is an example of the client device illustrated in FIG. 1. Client device 12 comprises remote session renderer subsystem 36, sensor 74, display 32 and controller device 34.

Remote session renderer subsystem 36 includes session controller 38, audio decoder 40, video decoder 42, timing synchronization 44, haptics data buffer 46, decoded audio buffer 48, decoded video buffer 50, mesh data buffer 52, saved mesh data buffer 54, thin rendering engine 56, decoded adaptive projection mapped frame 58, image renderer 60, haptics renderer 68, audio renderer 70, and controller data transmitter 72.

Session controller 38 provides a catalog of, for example, games for the user to choose from. When a user selects to play a game, session controller 38 sends a session setup request 104 for the selected game title to virtual environment rendering engine 11. Session setup request 104 includes device information such as processing capabilities, viewing devices resolution and field of vision in degrees and codecs supported. It can also contain a requested bandwidth and latency.

Session controller 38 receives a session setup response 106 with the bandwidth and latency information. Based on network conditions, the requested bandwidth and latency might not be met, however, the response may contain the latency and bandwidth that is available. The application developer may choose to not allow the session due to a poor QoE or an option may be to let the user choose to continue with the game with information about what the experience might be. There could be adjustments in cost of the game, for example, based on the user experience. These are merely some examples of how this information could be used.

Session controller 38 may receive low bandwidth notification 110 and/or high latency indication 112 from wireless network 14. Session controller 38 may determine whether to continue a session based on the new bandwidth and latency conditions.

When the remote virtual environment session is running, incoming encoded audio 116 is decoded at audio decoder 40, and raw audio 216 with time windows is sent to the timing synchronization 44 with the timing information and stored in decoded audio buffer 48.

Incoming encoded video 114 is decoded at video decoder 42, and raw video 214 with timing windows is sent to the timing synchronization 44 and stored in decoded video buffer 50. Incoming haptics data 120 with timing windows is stored in haptics data buffer 46 and the incoming rendering mesh data 118 with timing windows is stored in render mesh data buffer 52. The time windows in this example may use a presentation time stamp (PTS). Other timing could be used such as EPOCH time.

The video and audio may be behind the mesh data and haptics data because of the delay introduced by the projection remapping and encoding of the video and audio. The haptics and mesh data may arrive at the client faster and more presentation windows will be buffered for that data. When all data for rendering video, which includes decoded picture and rendering mesh data, audio data and haptics data, arrive for a time window (e.g., PTS) the audio, video with mesh data and haptics are ready to render. Audio data 316 is sent to audio renderer 70, decoded video and mesh data 218 are sent to image renderer 60 and haptics data 220 is sent to haptics renderer 68 and rendered to controller device 34.

In some embodiments, mesh data along with the custom 360 degree network adaptive viewport optimized remapped frame are the core components. Thin rendering engine 56 is a thin client that generates model view projection data 222. Model view projection data 222 is used by vertex shader 62 in image renderer 60 to properly render the correct visual information in display 32, such as a headset or on a monitor, within the 360-space based on where the viewport is pointing.

Typically, a virtual environment rendering engine only outputs the viewport view and performs this functionality internally. As described above, if this is done for remote rendering, the latency must be less than 20 ms or the user may experience motion sickness. Particular embodiments eliminate the less than 20 ms roundtrip latency requirement by delivering the full 360 degree video from the session engine to the client device and performing the model view projection locally versus on the remote session engine. Because this is executed locally and the video is sent as 360 degree video from the remote session engine to the client device, the less than 20 ms motion to photon requirement only exists locally on the client device.

There may be cases where the client device may not meet the less than 20 ms requirement. For example, processing power limitations on the client device may not be able to run the processes for the remote session. Typical limitations may be resolution, framerate and the type of video encoding used. Low end devices may not have the processing to decode 8K high framerate video or run advance codecs such as VVC. In particular embodiments, the remote virtual environment rendering system receives the device capabilities and the session will ensure the encoded video will be playable on the device.

In addition to generating model view projection data 222, thin rendering engine 56 may receive sensor data 202 from one or more sensors 74. Sensor 74 may comprise a gyroscope, accelerometer, magnetometer, structured light system, etc. Sensor data 202 may include headset orientation data or other data associated with a user's gaze.

Controller data transmitter 72 may send controller data 103 from controller device 34 to session engine 26 (illustrated in FIG. 1).

Thin rendering engine 56 may also generate headset orientation data 102 and send it to adaptive projection remapping subsystem 22 to rotate the custom projection map to offer the highest pixel density to the area where the headset viewport is looking in the 360 degree space. Other data could be used.

Image renderer 60 provides the image data to display 32, such as a monitor or headset display. Because particular embodiments use a custom projection map for foveated rendering, the frame must be rendered properly in the display. Mesh data 222 may be used by vertex shader 62 for the proper headset or monitor rendering. Vertex shader 62 outputs vertex texture coordinate 224 to interpolation rasterization 64, which generates an interpolated texture coordinate 226 for fragment shader 66. Fragment shader 66 receives projection mapped raw image 58 and the image is rendered in display 32.

In addition to bandwidth savings by using the custom projection mapping, the foveated rendering enables a higher quality of video to be displayed in the headset on lower end devices. Rather than sending the pixels evenly packed across the 360 degree space, the pixel density is highest in the headset point of view, offering a higher quality of experience to the user. This is done by eliminating the device computing required to decode the full 360 degree video at the higher resolutions but giving a similar quality as if the full 360 degree video was encoded at the higher resolution.

Figure 3A:
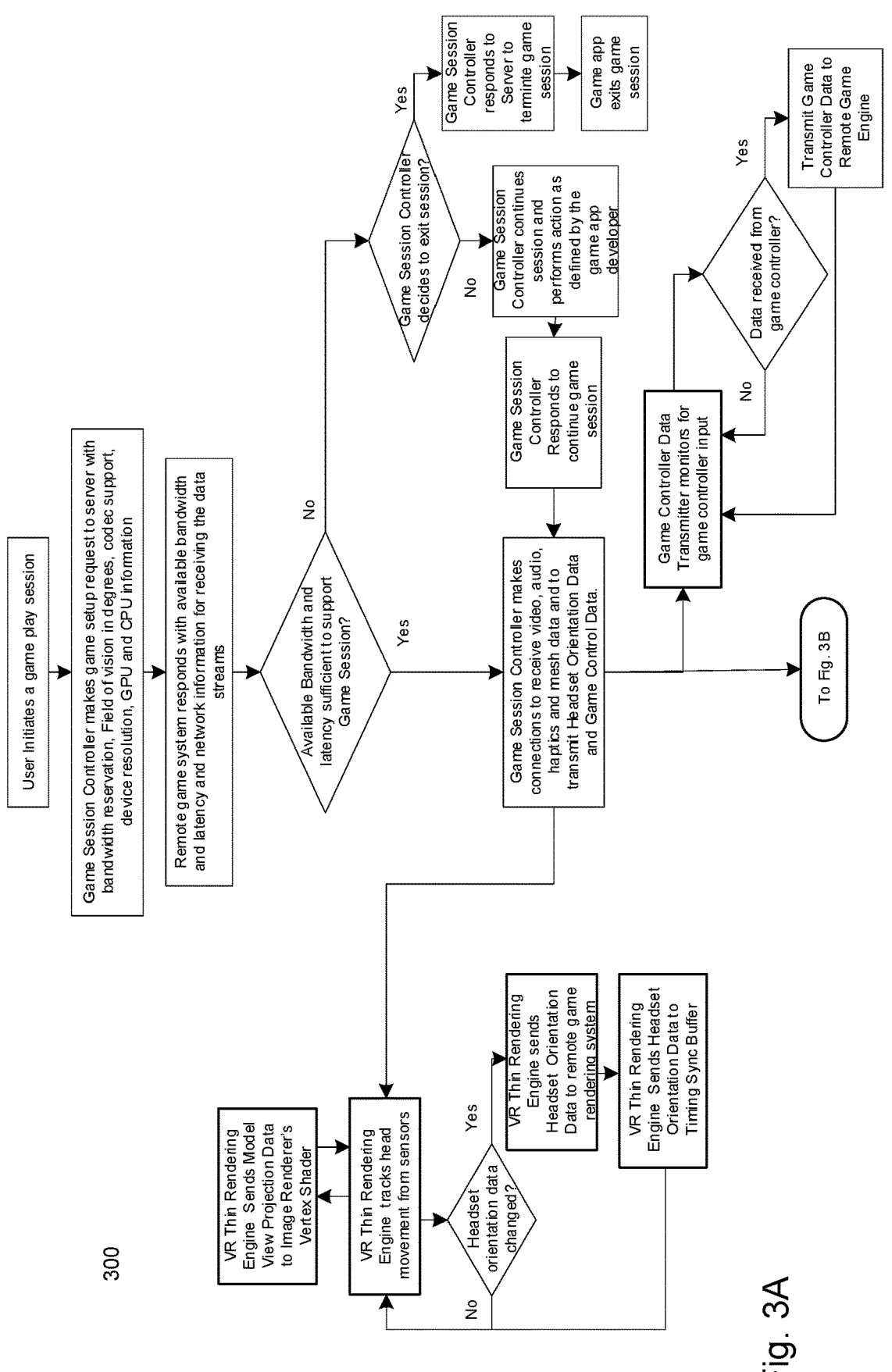
FIGS. 3A and 3B comprise a flow diagram of an example method in a client device for remote virtual environment rendering using custom foveated adaptive projection maps.
Figure 3B:
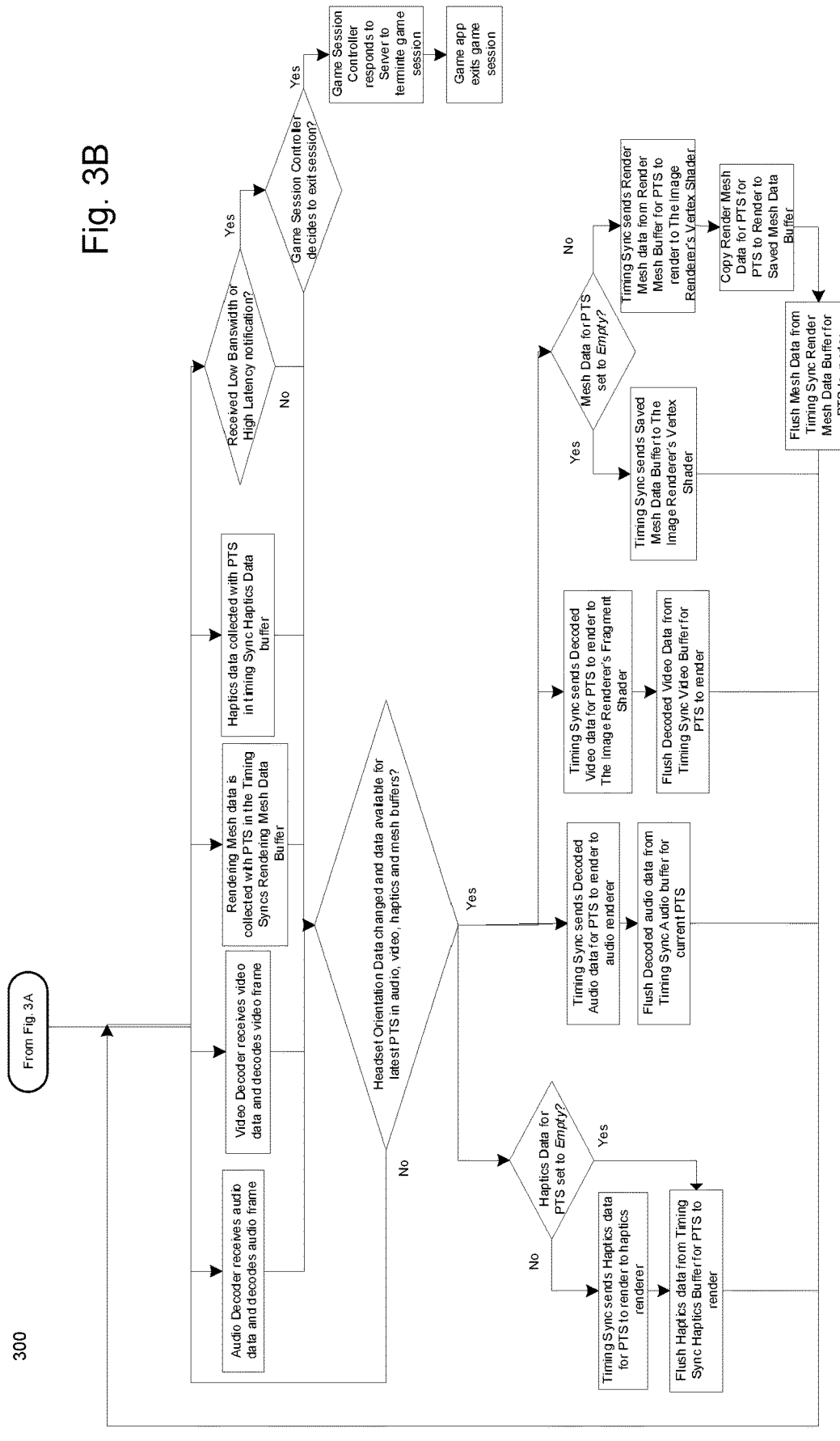
Figure 4B:
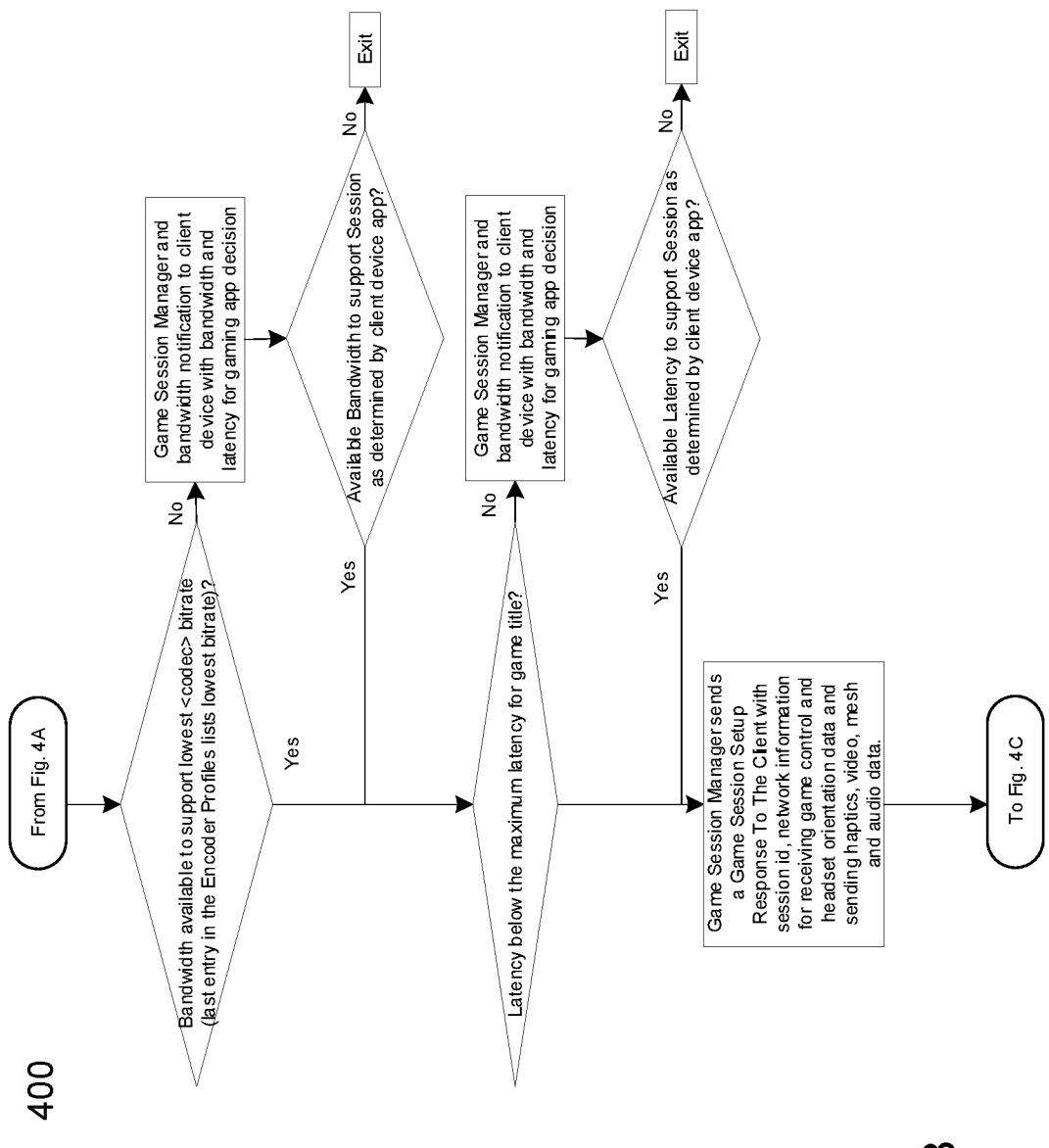
Figure 4C:
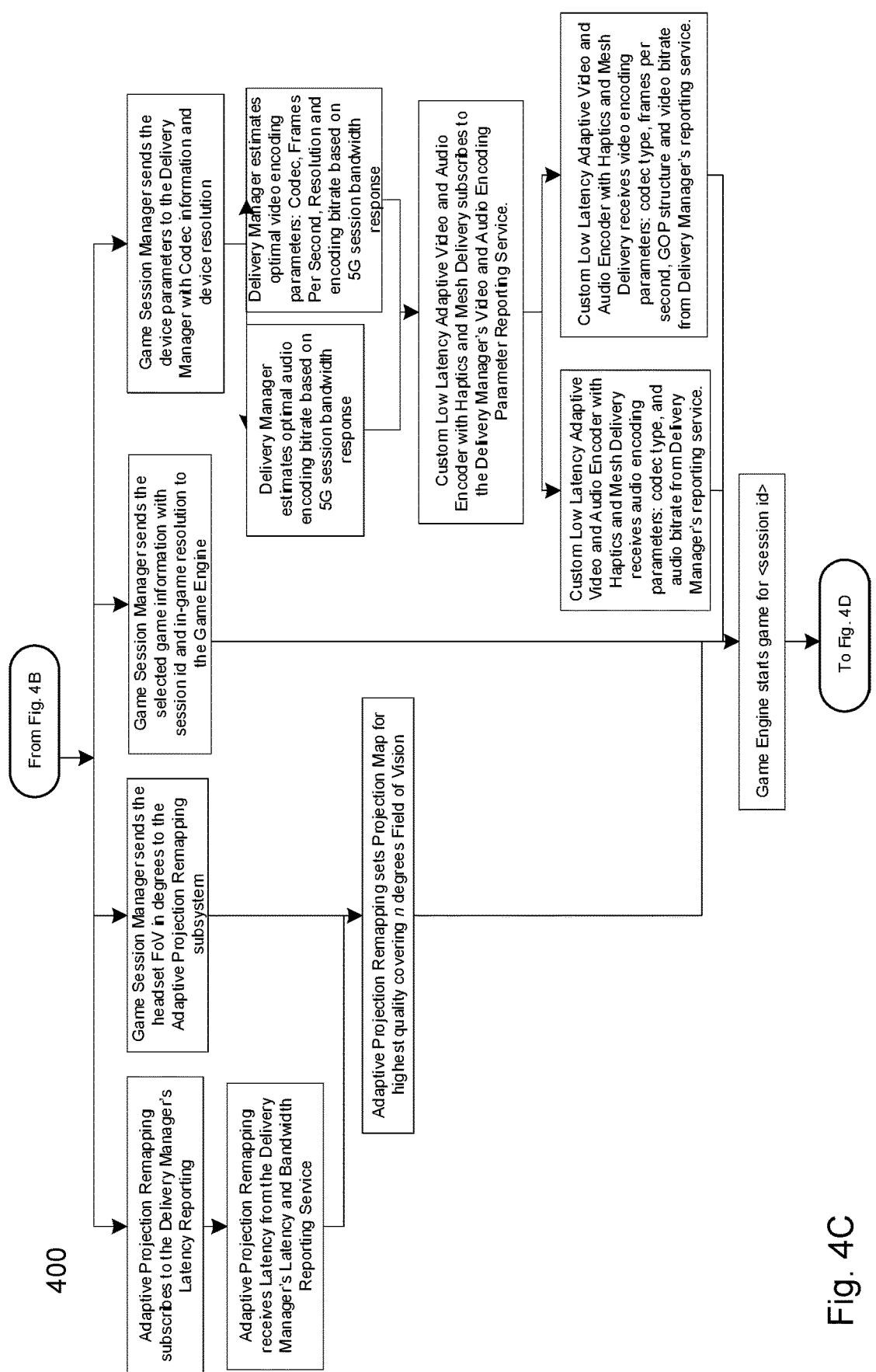
Figure 4D:
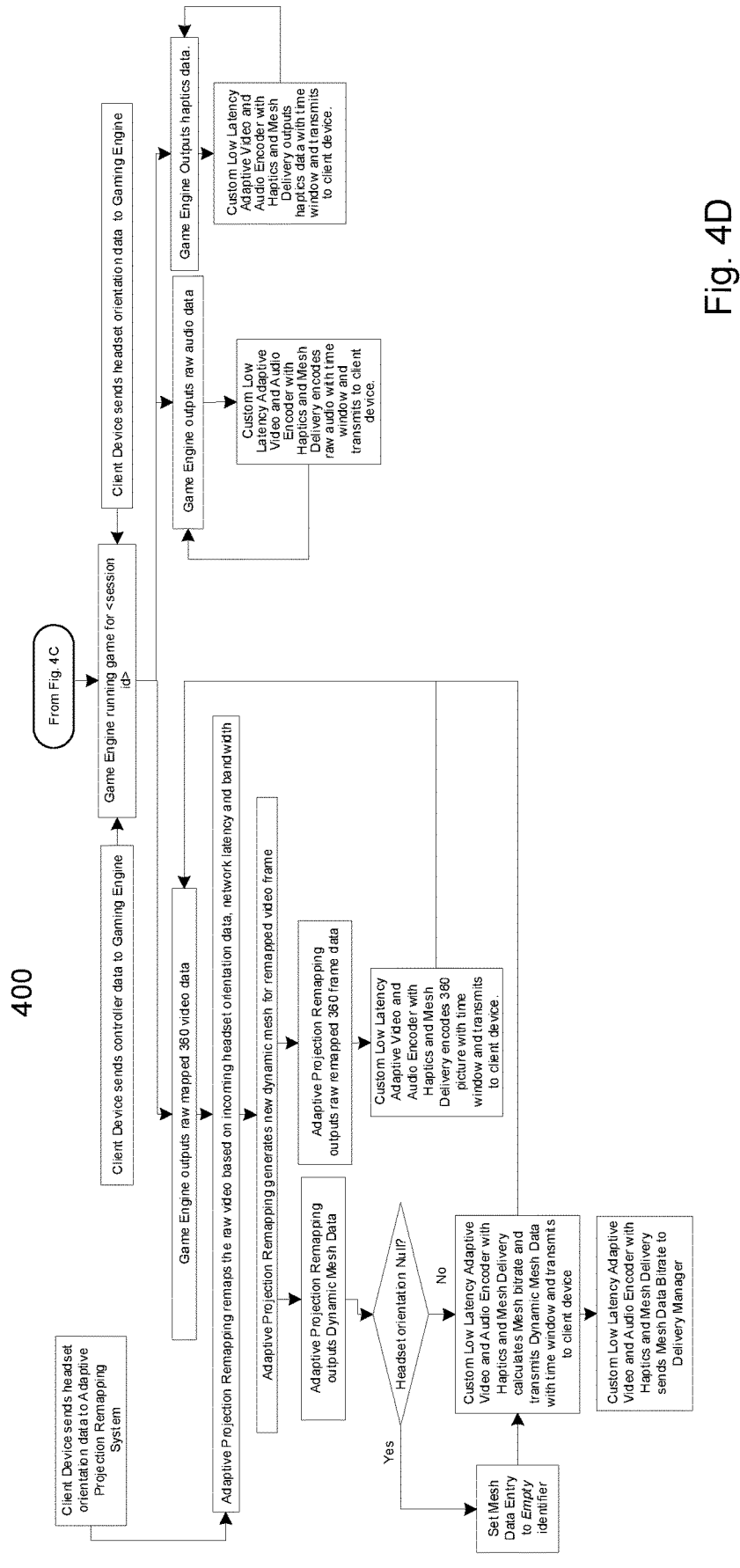

FIGS. 3A and 3B comprise a flow diagram of an example method in a client device for remote virtual environment rendering using custom foveated adaptive projection maps. In the illustrated example, the virtual environment session comprises a game session. The flow illustrates a game session from initial setup and includes updating adaptive projection maps based on gameplay (e.g., headset orientation, controller data, etc.) and bandwidth and/or latency changes.

FIGS. 4A-4D comprise a flow diagram of an example method in a remote virtual environment rendering system. The remote virtual environment rendering system may include remote game VR and non-VR game rendering using custom foveated adaptive projection maps. The illustrated example highlights the interaction of components the components of FIGS. 1 and 2 based on network feedback and changes of the headset orientation controlling the custom projection map and adjustments to encoding.

The session engine may output 360 degree video using a conventional projection map using standard cube map, equiangular map, etc. These may be static for the duration of the session. The remapping in particular embodiments to the adaptive maps are optimized giving the highest pixel density to the viewport. The maps may also adapt to changes in bandwidth and latency, as illustrated. For example, the n degree field of vision may be determined based on bandwidth and latency.

FIG. 5 is a table representing small-scale example of a database of resolutions, frame rates, bitrate ranges for two different types of codecs supports as well as the game title requirements. The table may be used by the session manager to send a set of requirements to the delivery manager for managing the encoder based on changes in bandwidth.

FIG. 6 is table representing a small-scale example of a database of latency limits for game title requirements. The table may be used by the session manager to send a set of requirements to the delivery manager for determining if the latency is too high and send a high latency notification back to the session manager when the latency goes above the high latency limit for the game session based on the game title being played.

Figure 7A:
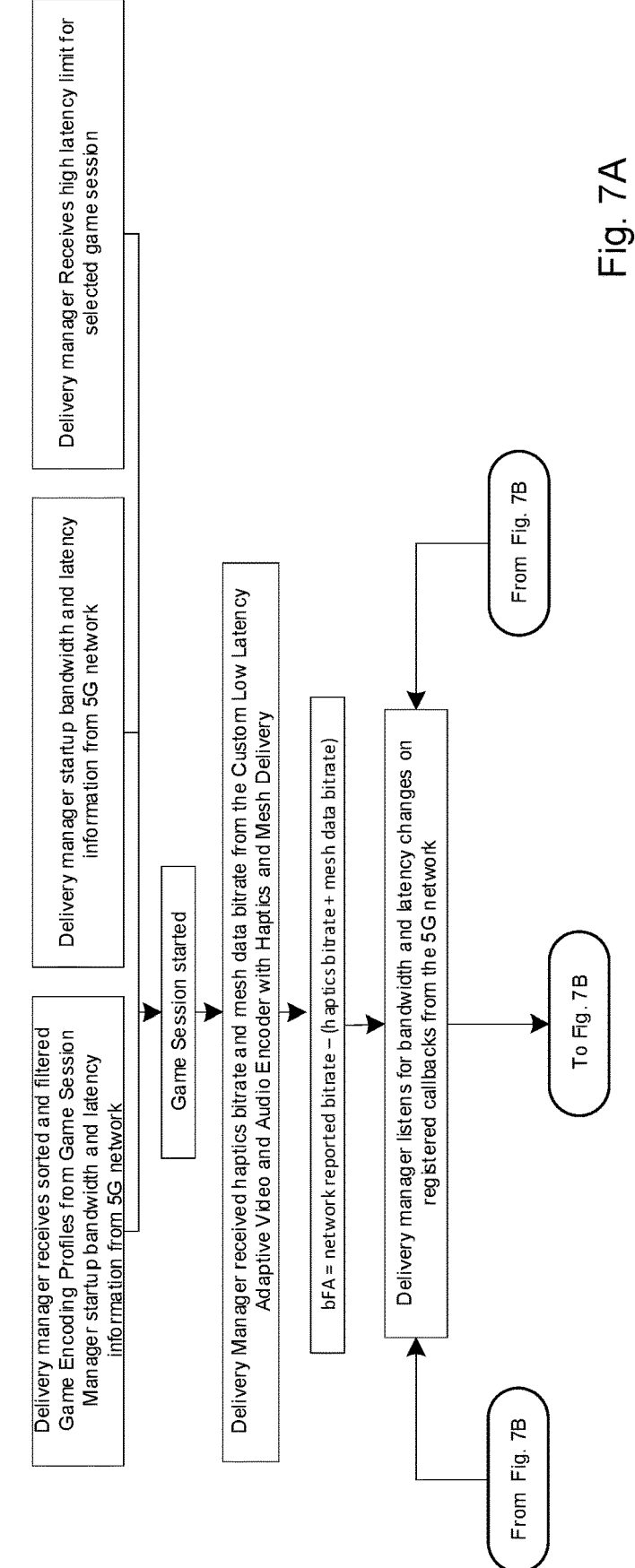
FIGS. 7A-7C comprise a flow diagram illustrating a method in the delivery manager during a virtual environment session, according to a particular embodiment.
Figure 7B:
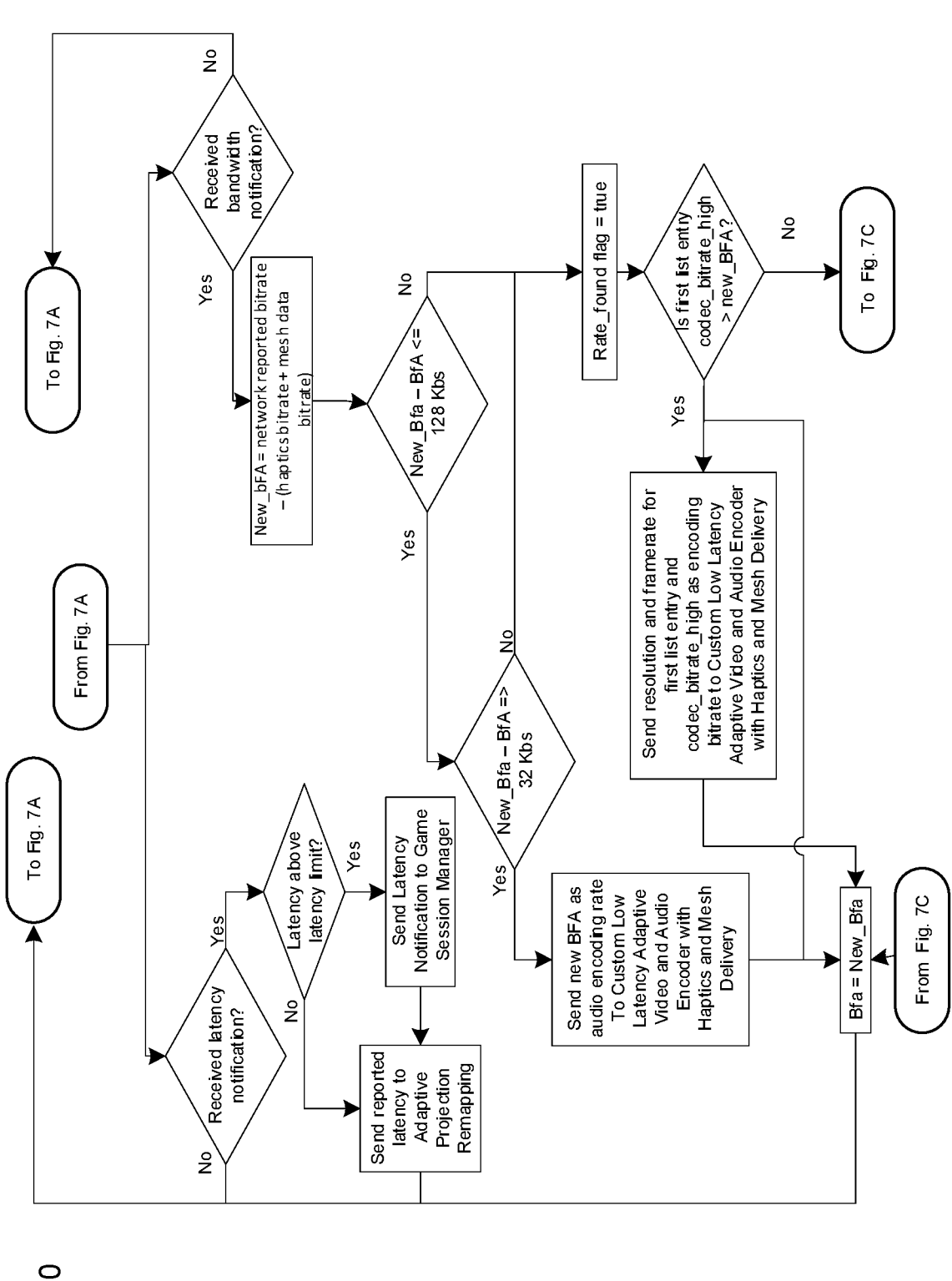
Figure 7C:
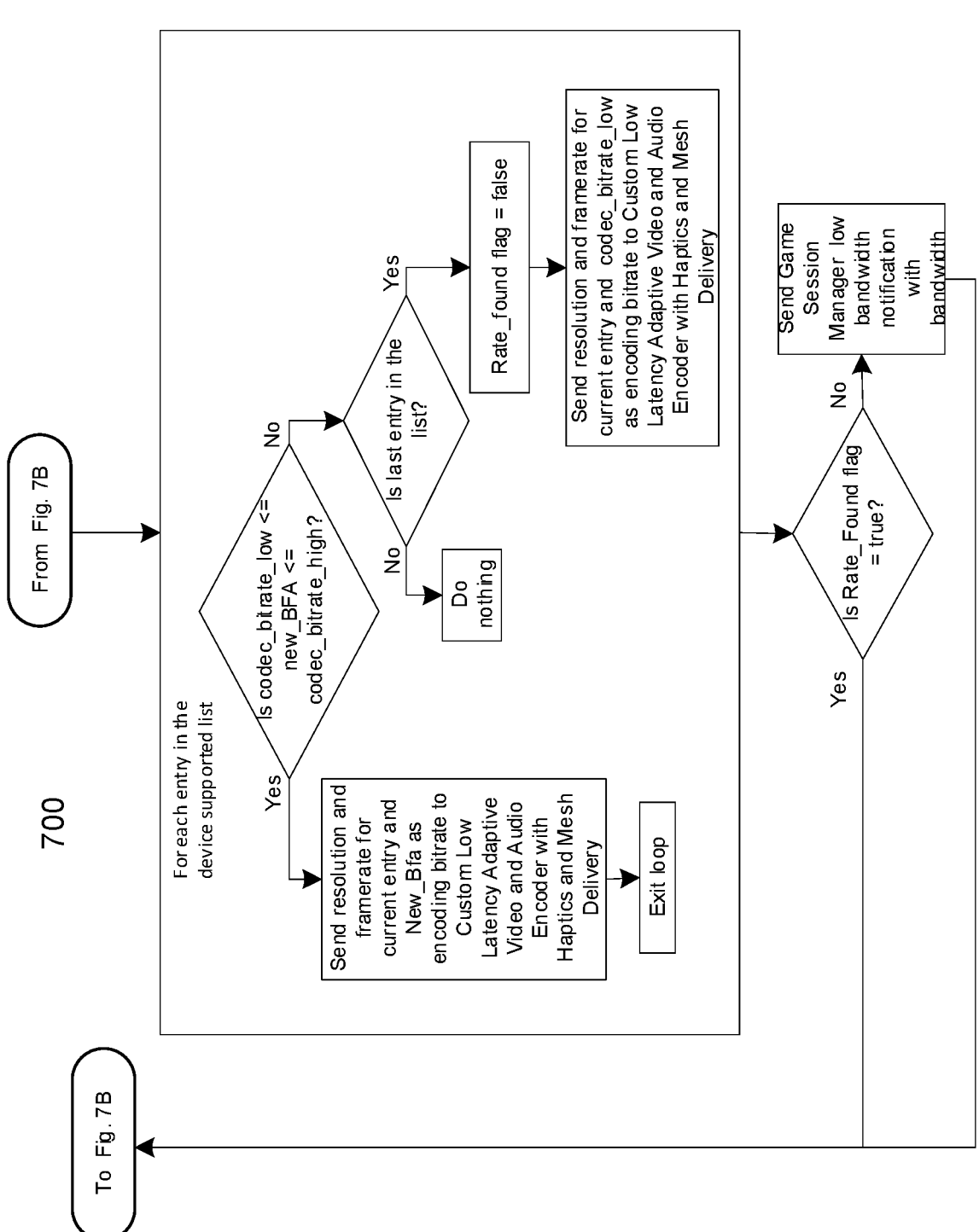

FIGS. 7A-7C comprise a flow diagram illustrating a method in the delivery manager during a virtual environment session, according to a particular embodiment. In general, the delivery manager listens for bandwidth and/or latency changes from the wireless network. Upon detecting a change, the delivery manager updates the adaptive projection remapping subsystem.

The illustrated example may use high-efficiency video coding (HEVC) and/or versatile video coding (VVC). HEVC supports framerates up to 300 fps and resolution up to 8192×4320. The illustrated example may use HEVC encoding and assume a maximum framerate of 120 Hz and a maximum resolution of 8K. Other codecs and resolutions can be supported.

The illustrated example may use high-efficiency advanced audio coding (HE-AAC). HE-AAC can support 5.1 surround sound at only 128 Kbs and stereo down to 32 Kbs. The illustrated example assumes a max HE-AAC audio encoding rate of 128 Kbs.

Figure 8:
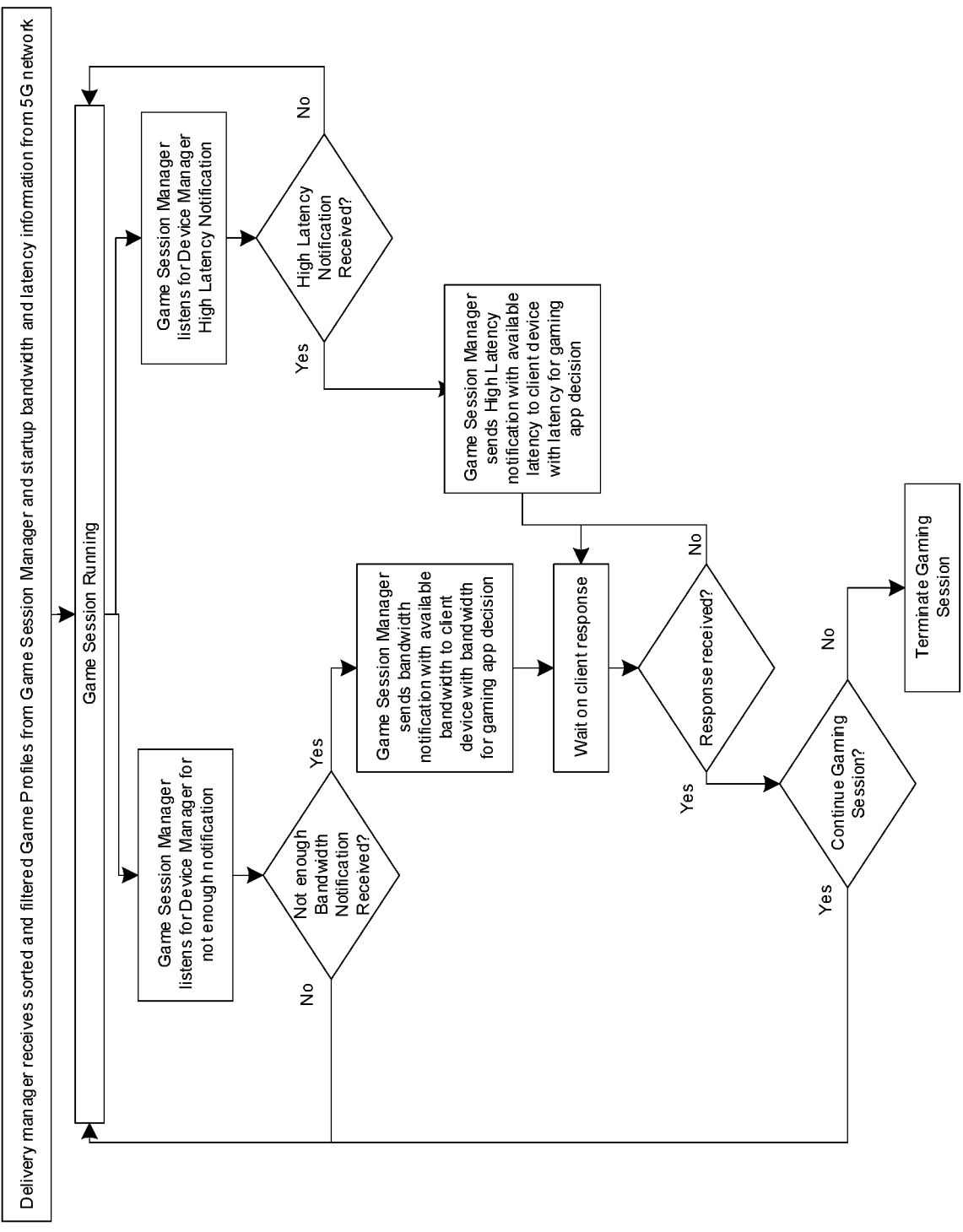
FIG. 8 is a flow diagram illustrating a method in the session manager during a virtual environment session, according to a particular embodiment.

FIG. 8 is a flow diagram illustrating a method in the session manager during a virtual environment session, according to a particular embodiment. In general, the session manager listens for high latency and/or low bandwidth indications and communicates these to the client device. The client device indicates to the session manager whether the client device is willing to continue the session based on the updated conditions.

Figure 9A:
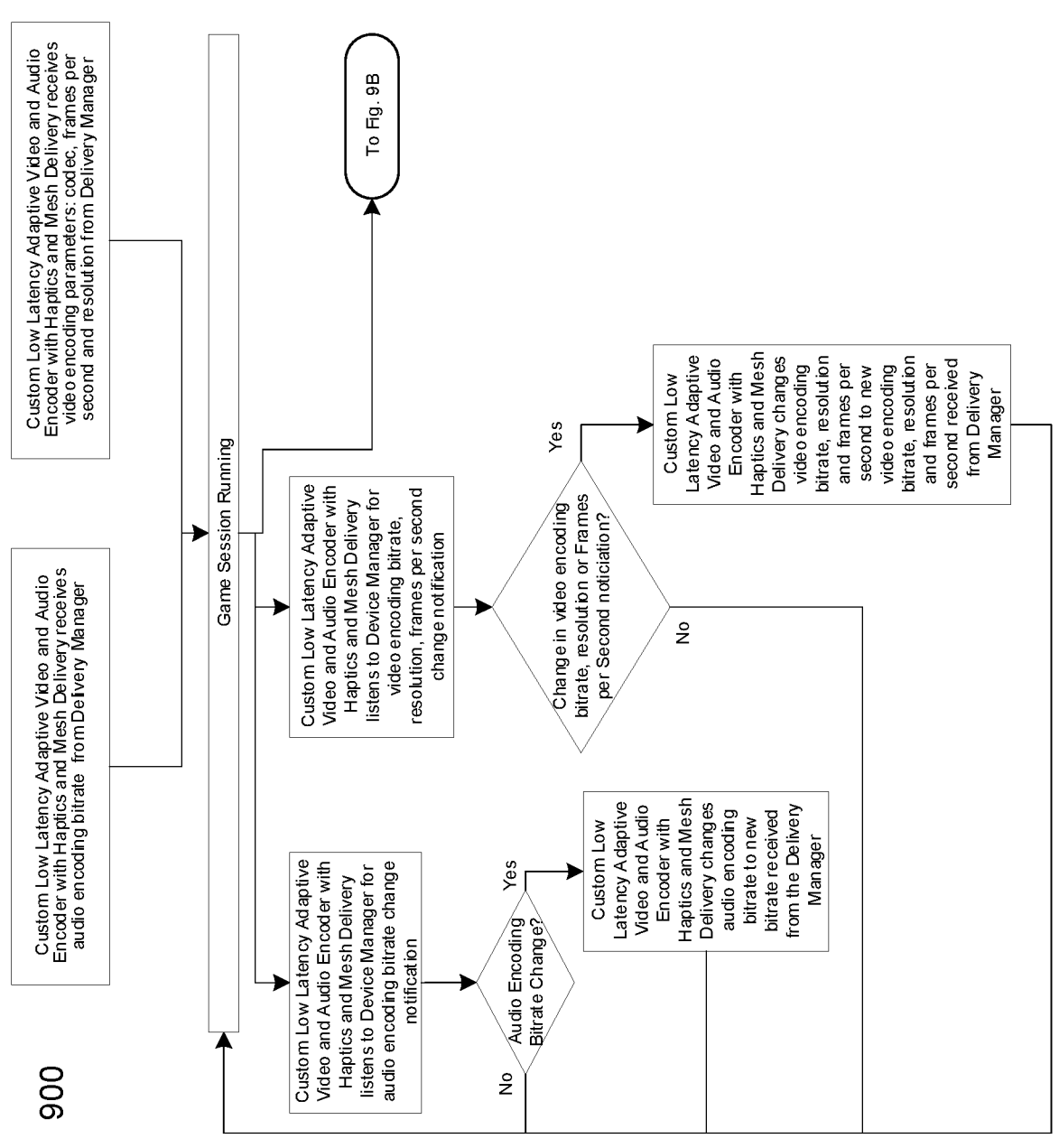
FIGS. 9A and 9B comprise a flow diagram illustrating a method in the low latency adaptive video and audio encoder with haptics and mesh delivery subsystem during a virtual environment session, according to a particular embodiment.
Figure 9B:
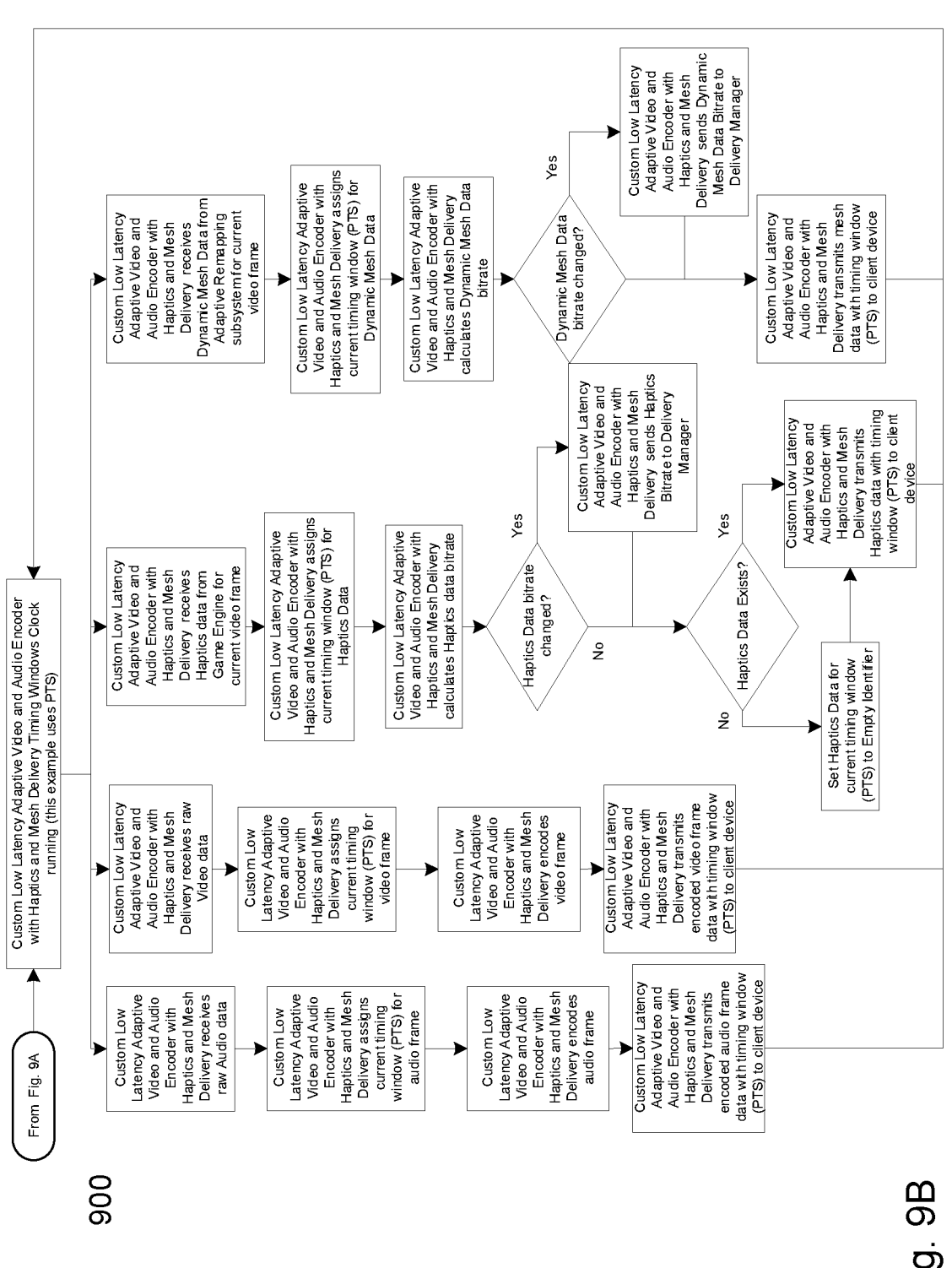

FIGS. 9A and 9B comprise a flow diagram illustrating a method in the low latency adaptive video and audio encoder with haptics and mesh delivery subsystem during a virtual environment session, according to a particular embodiment. In general, the low latency adaptive video and audio encoder with haptics and mesh delivery subsystem adapts audio, video, haptics data, and/or mesh data bitrates.

As described above, particular embodiments include dynamic adaptive projection maps, which are described in more detail with respect to FIGS. 10-20. For background information, two known projection formats are described along with their limitations. Following that, particular embodiments are described that use a pizza box projection format and another projection format, mini views, that is modified for dynamic adaptive projection mapping.

The common rendering pipeline in a modern (e.g., 2010-2020) graphics processing unit (GPU)-based rendering engine revolves around texture-mapped polygons in a 3D space. Each polygon has vertices with an X,Y,Z (spatial) coordinate and one or more U,V (texture) coordinates (because in all but the simplest apps textures are layered). However, when dealing with skyboxes, there are some projections that cannot be accurately modeled by a polygon mesh. For example, cubemaps, miniviews and pizza box can, but equiangular cubemaps and equirectangular can only be approximated by polygons.

A-well-known non-mesh skybox is the equirectangular projection (ERP). The equations governing the ERP include $$\theta=2\pi(u-0.5)$$

$$\varphi=\pi(v-0.5)$$

$$y=\sin(\varphi)$$

$$x = \cos(\varphi)\,\sin(\theta)$$

$$z = -\cos(\varphi)\,\cos(\theta)$$

A mathematically accurate skybox shader will translate from the x,y,z ray to $\theta$, $\varphi$, and then u,v to sample the ERP texture.

It is possible to make a mesh approximating an ERP using a UV sphere, but because the poles are degenerate, visual quality suffers there. The distortion gets worse as the polygons get coarser.

An equiangular cubemap can be approximated by a mesh that subdivides each square face into many smaller squares. Using a 10×10 decomposition is a good approximation, and dividing it finer provides even better results. Using the traditional OpenGL right-handed coordinate system with "−Z means forward", and "+Y means up" (which is different than Unity's left-handed coordinate system) then the front plane has Z=−1, and the vertices have various combinations of X∈{1,−1} and Y∈{1,−1}.

The perfect mathematical relationship between equiangular texture coordinate (u,v) and spatial coordinate would be $$\theta = \frac{\pi}{2}(u - 0.5)$$

$$\varphi = \frac{\pi}{2}(v - 0.5)$$

$$x = \tan(\theta)$$

$$y = \tan(\varphi)$$

These equations hold for the front face and using a texture whose entirety is the front face. Because usually all six cube faces are packed into the same texture, these equations would have to be modified to handle traditional application architecture. An optimal cubemap arrangement places the front face in the middle top sixth of a 3×2 mosaic so the texture would be sampled using (u',v') where $$u' = \frac{(u + 1)}{3}$$

$$v' = \frac{(v + 1)}{3}$$

Each different face has slight variations on these equations which are omitted for the sake of brevity, and because there are multiple cubemap layouts in use and each one requires its own set of transformations.

In a game rendering engine that intends to perform mathematically accurate sampling of an equiangular cubemap skybox, the engine maps the pixel being rendered to a directional ray in world space.

The X,Y,Z of the ray is examined to determine which cube face it travels through, and then the x, $\theta$, u, y, $\varphi$, v appropriate equations (the ones for −Z face are listed above) are inverted to calculate the proper u, v, which is usually then transformed to a u', v' using the formula for the specific face appropriate to the cubemap layout in use.

An alternative to a mathematically-accurate equiangular cubemap is to use a polygonal approximation of au cubemap that uses the family of formulas referenced above to calculate the coordinates of the corners of the decomposed polygons, but then the original skybox is sampled not according to the trigonometrically-accurate rules listed above, but instead according to how the polygon will be rendered by a traditional vertex/fragment shader.

This approach avoids the hassle of writing a skybox shader that uses trigonometry but pays the price in slightly-less-uniform spherical pixel density.

Particular embodiments described herein may use a pizza box projection to create a skybox with a front panel large enough to fill a headset whose field of view (FOV) is larger than 90 degrees, which is most headsets. The pizza box is also beneficial when expanding the high quality past the headset FOV when expanding the area due to increased network latency for remote rendered gaming. The advantages of the equiangular pizza box over the equiangular cubemap viewed from within a headset with a FOV greater than 90 degrees will have to use pixels from the side panels. It is also possible to increase the aspect ratio of a pizza box to provide extra front/high-resolution pixels extending beyond the viewport even if the client turns the headset. The extension beyond the viewport will vary dynamically based on changes in network latency. As used herein, the term "pizza box" is used to refer to a cuboid shape (e.g., a square cuboid, a rectangular cuboid) that has two faces that are larger than the remaining faces. For example, a pizza box may have two faces, where the largest face is the front of the pizza box and the smallest face is the back. The sides, top and bottom are the same size but smaller than the front.

Another advantage of the equiangular pizza box is to vary the resolution of the panels (high resolution in front, medium on the sides, and low in the back). The equiangular pizza box may provide pixels for the entire skybox, while not wasting significant bandwidth to encode the parts that will not usually be rendered in the headset, but still include those parts if the client turns his head between when the headset orientation was sampled and when the frame is rendered in the head set (i.e., gaze slew, time warp). The slew or time warp is directly related to how high the end to end latency is.

A drawback to a non-equiangular pizza box is as the aspect ratio of the pizza box increases (either because the headset FOV increases, or the server tries to anticipate greater gaze slew) the pixels at the edge cover less and less degrees of arc, because $$\frac{d}{dx}\tan^{-1}x$$

gets smaller the larger x becomes. This is the same motivating factor behind the equiangular cubemap projection. Particular embodiments apply the principles of equiangular projection to a pizza box. The formulas may increase in complexity because the faces are not all squares at the same distance from the origin.

In the following equations, ar is the aspect ratio; and fov is the field of view. For the front face $fov_f = 2\,\tan^{-1}\,ar$ (for calculating the FOV front based on incoming aspect ratio; some embodiments receive the degree FOV in the client and calculate the aspect ratio).

$$ar = \tan\frac{fov_f}{2}$$

$$\theta = fov_f(u - 0.5)$$

$$\varphi = fov_f(v - 0.5)$$

$$x = \tan(\theta)$$

-continued $$y = \tan(\varphi)$$

$$z = \frac{1}{ar}$$

The sides are more complex. The following are formulas for the right side panel (x=1):

$$fov_s = 2\ \tan^{-1}\frac{1}{ar}$$

$$\theta = fov_s(u_s - 0.5)$$

$$\varphi = \frac{\pi}{2}(v_s - 0.55)$$

$$z = \tan(\theta)$$

$$y = \tan(\varphi)$$

$$x = 1$$

The relationship between the pixel densities of the two panels is also somewhat more complicated than the original pizza box projection. The principle of equiangular is that pixels along the equator and cardinal meridians take up the same angle of arc as other pixels. Define the pixel density for a panel as $$\frac{w}{fov}$$

where w is the number of pixels on the axis of fov.

For an example with aspect ratio 2 with a front panel diameter of 2048:

$$fov_f = 2\ \tan^{-1}\ 2 = 126.87°$$

$$w_{f=2048}$$

$$\frac{w}{fov_f} = \frac{2048}{126.87} = 16.14$$

If the side panels are to be half that resolution (8.07 pixels/degree), then $$fov_s = 2\ \tan^{-1}\frac{1}{2} = 53.13°$$

$$8.07 = \frac{w_s}{fov_s} = \frac{w_s}{53.13}$$

$$8.07 \times 53.13 = w_s = 428.8$$

Therefore, a side panel will have width 428.82. Its height is different because the long fov of a side panel of a pizza box is always 90°.

$$8.07 \times 90 = 726.4$$

The full set of equations for relating equiangular panel dimensions (side panels $w_s \times h_s$; rear panel $w_r \times w_r$) is $$w_s = \frac{fov_s}{c_s}\frac{w_f}{fov_f}$$

-continued $$h_s = \frac{90°}{c_s}\frac{w_f}{fov_f}$$

$$w_r = \frac{fov_r}{c_r}\frac{w_f}{fov_f}$$

$$fov_r = fov_f$$

$$w_r = \frac{w_f}{c_r}$$

Particular embodiments vary the density of the pixels based on the viewer's gaze. In a pizza box the highest pixel density naturally is used for the front panel. The side panels can have a reduced pixel density, and the rear can be even lower.

One complication is that there are two kinds of pixel density: angular and spatial. A 100-centimeter cube that is 1000 m away covers about the same angle as a 1 cm cube 10 m away. The angular measurement of the two objects is identical while the spatial dimension is drastically different. Because pizza box panels are at different distances from the viewer (and as the aspect ratio increases, even different parts of the front panel are at significantly different distances), this must be factored in.

In an example uniform mesh cube projection map, all sides may comprise squares having 2048×2048 pixels:

front center pixel density=0°3'21"

front edge pixel density=0°1'41"

front corner pixel density=0°1'7"

A simplistic texture layout would be 2048×12288 pixels. An example is illustrated in FIG. 10.

Figure 10:
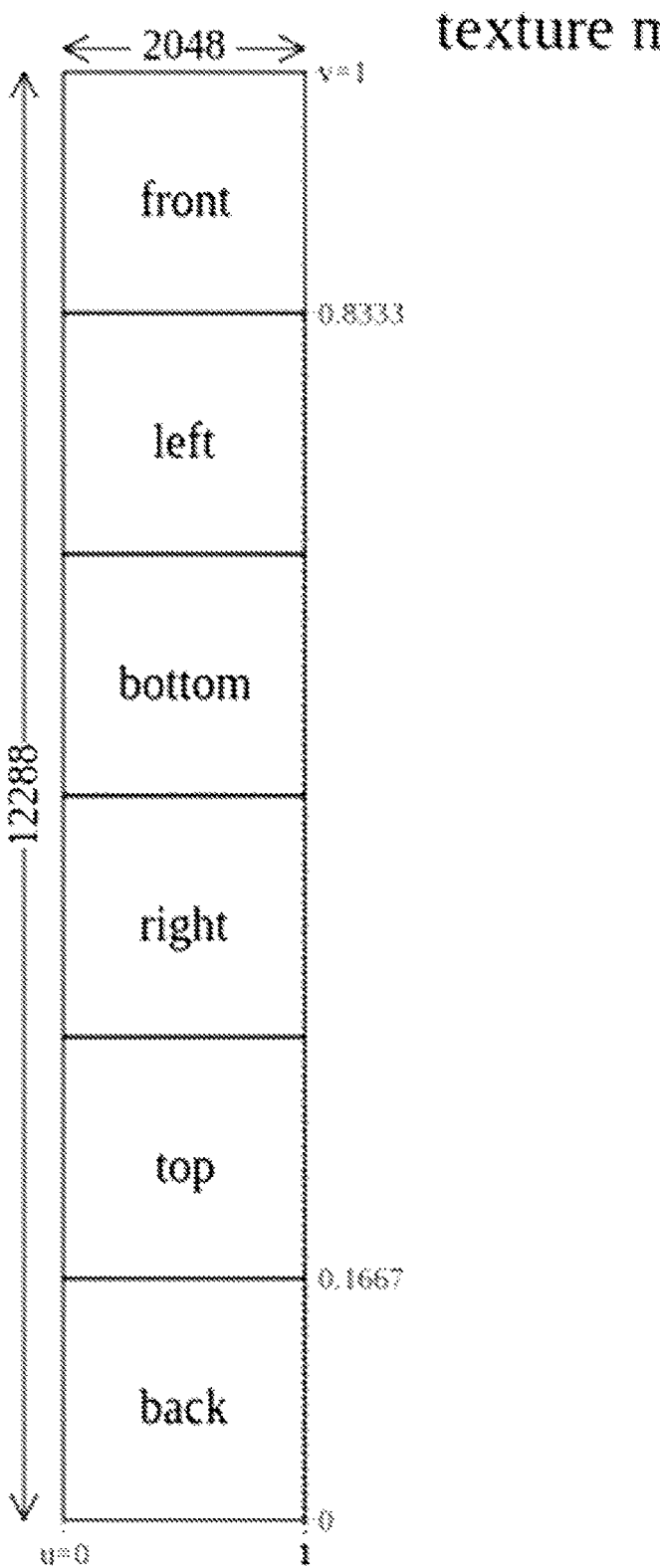
FIG. 10 is a block diagram illustrating an example uniform mesh cube projection map.

FIG. 10 is a block diagram illustrating an example uniform mesh cube projection map. As illustrated, all sides are squares having 2048×2048 pixels. A uniform pizza box with an aspect ratio of 1 is a cube projection map where all sides of the pizza box are equal. For a pizza box with an aspect ratio of 2, the thickness of the front and back panels is twice that of the side panels. If the resolution of the front and back are 32×32, for example, then the resolution of the side panels is be 32/2×32=16×32.

In an example uniform pizza box with aspect=2, the pizza box projection may have front/rear panel resolution 2048×2048 and side panel resolution 2048×1020:

front center pixel density=0°6'43"

front edge pixel density=0°1'21"

front corner pixel density=0°0'45"

side center pixel density=0°3'21"

side near edge pixel density=0°2'41"

side far edge pixel density=0°1'41"

side corner pixel density=0°1'30"

The pixel density on the side panels is finer than the front panel because while the pixels are identical in spatial measurements, they are farther away, and perspective causes the side pixels to be higher resolution. A simplistic texture layout would be 2048×8192 pixels. An example is illustrated in FIG. 11.

Figure 11:
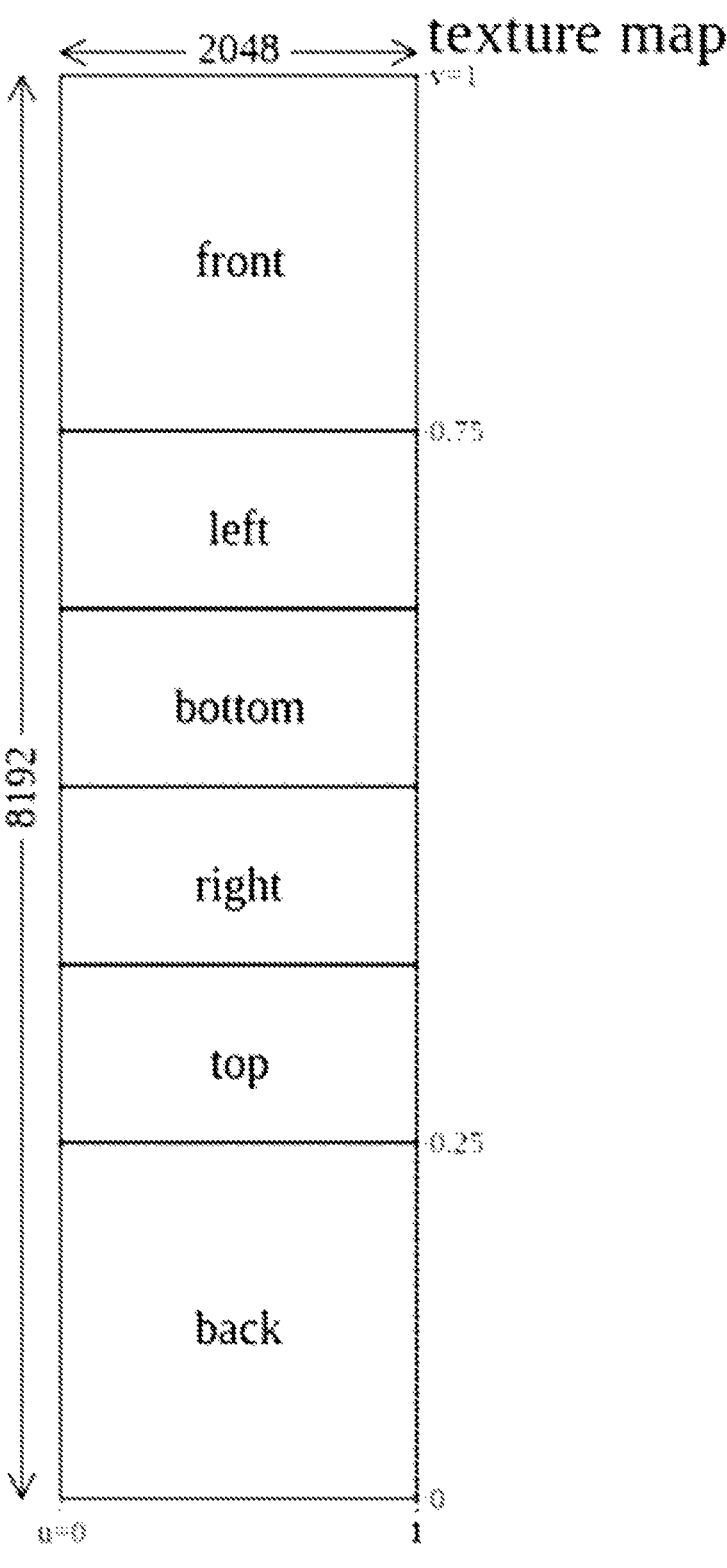
FIG. 11 is a block diagram illustrating an example uniform pizza box projection map with aspect=2.

FIG. 11 is a block diagram illustrating an example uniform pizza box projection map with aspect=2. As illustrated, the front/rear panel resolution is 2048×2048 and side panel resolution is 2048×1020.

A mixed scale pizza box can vary resolutions across all panels. An example is a pizza box with aspect ratio of 2 with a front resolution of 32×32. The coarseness of the front is 1 so the resolution is 32/1×32/1=32×32. If the back coarseness is 4, then the resolution of the back is 32/4×32/4=8×8. If the side coarseness is 2, then the side resolution is 16/2×32/2=8×16.

In an example mixed-scale pizza box with aspect=2, the mixed-scale pizza box projection may have front panel 2048×2048, side panel 1024×512, and rear panel 1024×1024:

front center pixel density=0°6'43"
  front edge pixel density=0°1'21"
  front corner pixel density=0°0'45"
  side center pixel density=0°6'43"
  side near edge pixel density=0°5'22"
  side far edge pixel density=0°3'21"
  side corner pixel density=0°2'59"
  rear center pixel density=0°13'
  rear edge pixel density=0°2'41"
  rear corner pixel density=0°1'30"

The pixel density of the center of the front and side are identical due to perspective, and the rear pixel density is about half. A simplistic texture map would be 2048×5120 pixels. An example is illustrated in FIG. 12.

Figure 12:
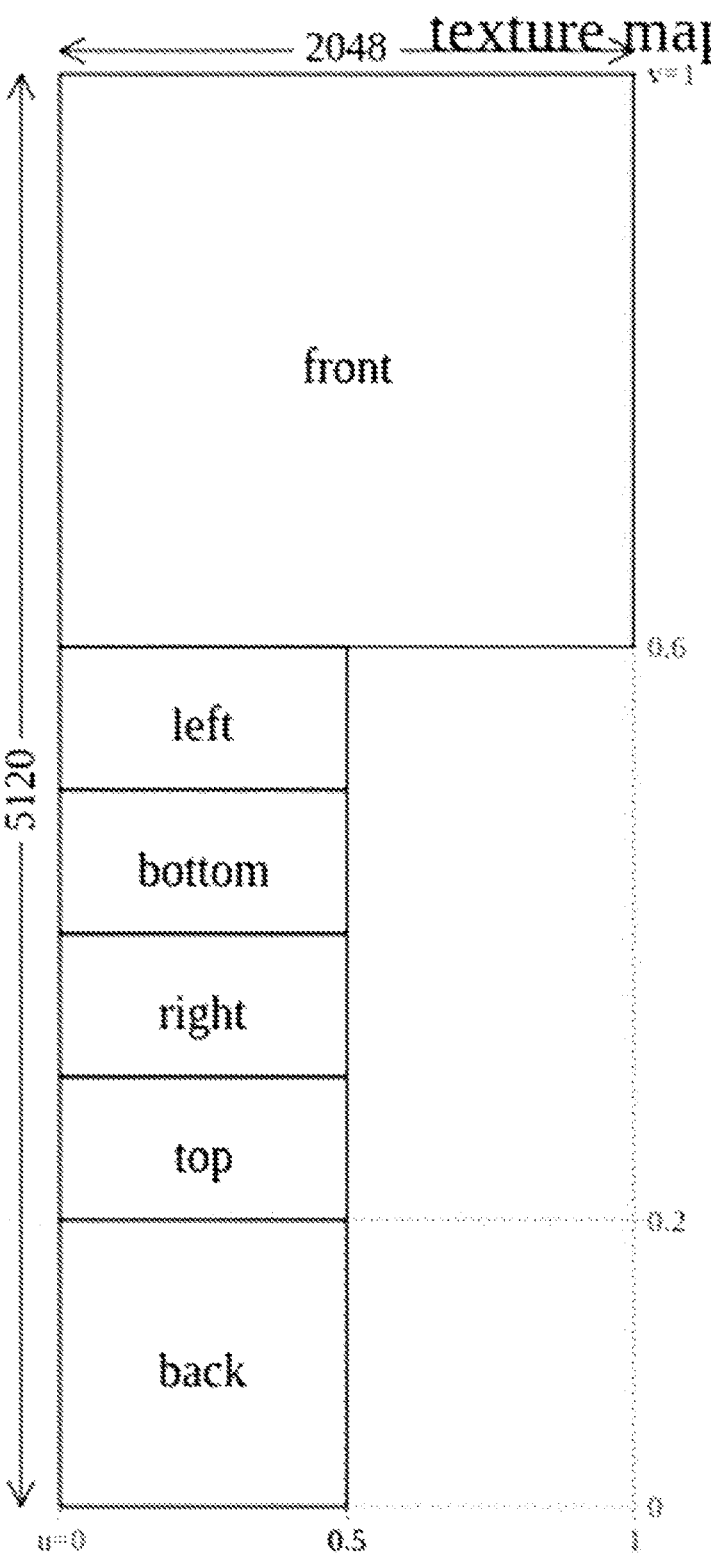
FIG. 12 is a block diagram illustrating an example mixed-scale pizza box projection map with aspect=2.

FIG. 12 is a block diagram illustrating an example mixed-scale pizza box projection map with aspect=2. As illustrated, the front panel resolution is 2048×2048, side panel resolution is 1024×512, and rear panel resolution is 1024×1024.

A goal of equiangular projections is for pixels on a panel to have a uniform angular size. Unfortunately, while this is possible on the major axes, in the corners of a panel, this is mathematically impossible. Still, particular embodiments do as well as possible.

Along a major axis the pixel density can be calculated as the number of pixel columns (or rows) divided by the FOV of the panel on that axis.

$$ar = \tan\frac{fov}{2}$$

Considering the geometry of a pizza box with aspect ratio 2

$$fov_f = 2\ \tan^{-1} 2 = 126.87°$$

$$fov_{s1} = 2\ \tan^{-1}\frac{1}{2} = 53.13°$$

$$fov_{s2} = 90°$$

If the front panel is 2048×2048 pixels $$d_f = \frac{2048}{fov_f} = 16.14\frac{\text{pixels}}{°}$$

$$d_s = \frac{n_{s1}}{fov_{s1}} = d_f = 16.14$$

$$16.14 \times 53.13 = n_{s1} = 857.7$$

$$16.14 = \frac{n_{s2}}{fov_{s2}}$$

$$16.14 \times 90 = 1452.8$$

Each side panel of an equiangular pizza box with aspect ratio 2 should be 858 pixels on the z axis, and 1453 pixels on the long axis to have equal pixel density as the front panel.

Using a mixed-scale equiangular pizza box, then the pixel density of the non-front panels will be the density of the front panel divided by the coarseness.

$$d_s = \frac{d_f}{c}$$

If the side panels have a coarseness of two (c=2), then the equations above can be modified as follows:

$$d_s = \frac{n_{s1}}{fov_{s1}} = \frac{d_f}{c} = \frac{16.14}{2}$$

$$n_{s1} = fov_{s1}\frac{16.14}{2} = 53.13 \times 16.14 \div 2 = 428.83$$

And similarly, for $n_{s2}$ to compute a side panel size of 429×726.

Another complication for equiangular when deviating from a cube is that there is a mismatch between the pixels at the edges between faces. In the first example above (before considering coarseness) the front panel had a resolution of 2048×2048 and the side panel was 858×1453. These two panels meet at an edge where the front panel has 2048 pixels and the side panel has 1453, so the pixels do not match up. This is mostly because textures exist in a cartesian 2D flat space, while the spherical space where angles are measured is not flat. An example is illustrated in FIG. 13.

Figure 13:
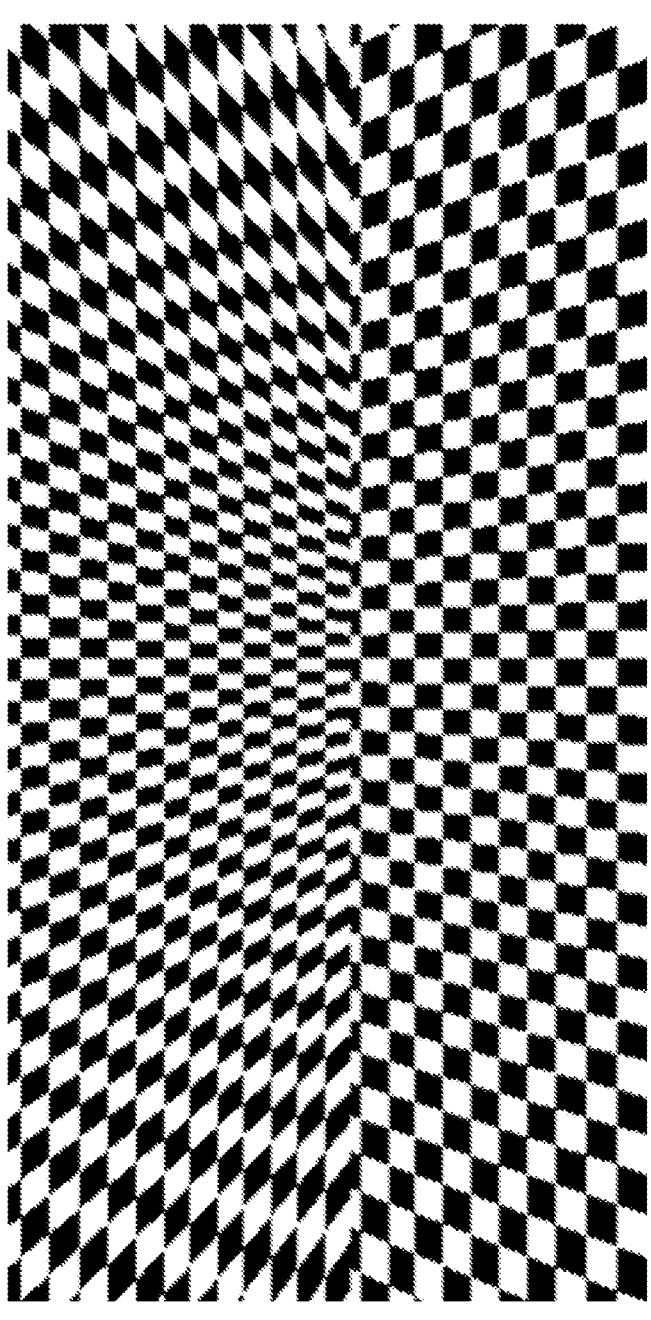
FIG. 13 illustrates an intersection between a front panel and a side panel.

FIG. 13 illustrates an intersection between a front panel and a side panel. As illustrated, the pixels do not line up at the intersection between panels.

Some embodiments include a relationship between skyboxes and the remote rendering thin client (e.g., illustrated in FIG. 2). As described above, a common model for a gaming engine is texture-mapped polygons. In many cases some directions the player can look are not completely covered by polygons (often the sky) and the engine paints that area using pixels from a skybox. Often the skybox is a texture-mapped cube that is centered on the camera that is rendered to the frame buffer before any polygons from the scene are rendered.

In a remote rendering thin client, the only graphical object transmitted from the remote rendering server to the thin client is conceptually like a skybox. It might not be a cube, or even traditionally texture-mapped (as exemplified by the alternatives outlined above), but it is a set of polygons that are centered on the camera and rendered to populate the frame buffer with a scene. The difference is that there are no other texture-mapped polygons to be rendered. It is barely distinguishable from a gaming engine with a skybox and nothing in the environment.

FIGS. 14-18 are examples of the outside of an adaptive pizza box projection map, according to particular embodiments. The examples use a field of vision setting of 126.870°. For illustration purposes, the front resolution is set to a low 32 pixel by 32 pixel resolution.

The side coarseness is the ratio of pixel density of the polygonal mesh for the top, bottom, left and right relative to the front. The back coarseness is the ratio of pixel density of the back of the pizza box (opposite of the viewport) from the front. The pixel density is highest in the viewport and reducing quality expanding in areas beyond the viewport. Network latency determines how far outside of the viewport the higher pixel density is expanded. The lowest pixel density will be at the back.

FIGS. 14-18 use a side coarseness of 2 and a back coarseness of 4. The x, y, z, u, v is the dynamic mesh generated based on example values entered. The texture map portion demonstrates the coverage of pixel density in the front, sides, top, bottom and back with the side coarseness set to 2 and the back coarseness set to 4. As described in an example above, coarseness is a factor used to scale down the resolution of the various sides of the pizza box in relation to the front resolution.

Figure 14:
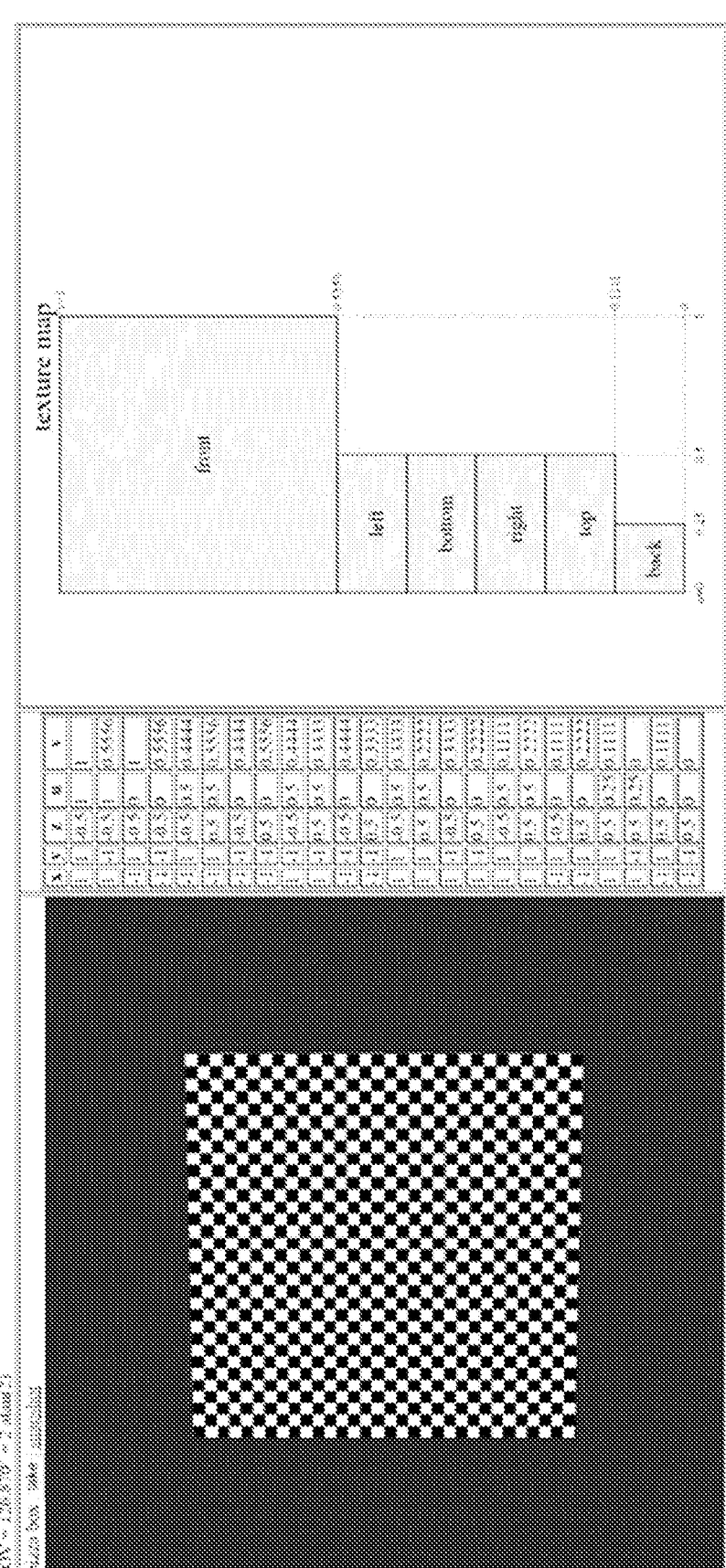
FIGS. 14-18 are examples of the outside of an adaptive pizza box projection map, according to particular embodiments.
Figure 15:
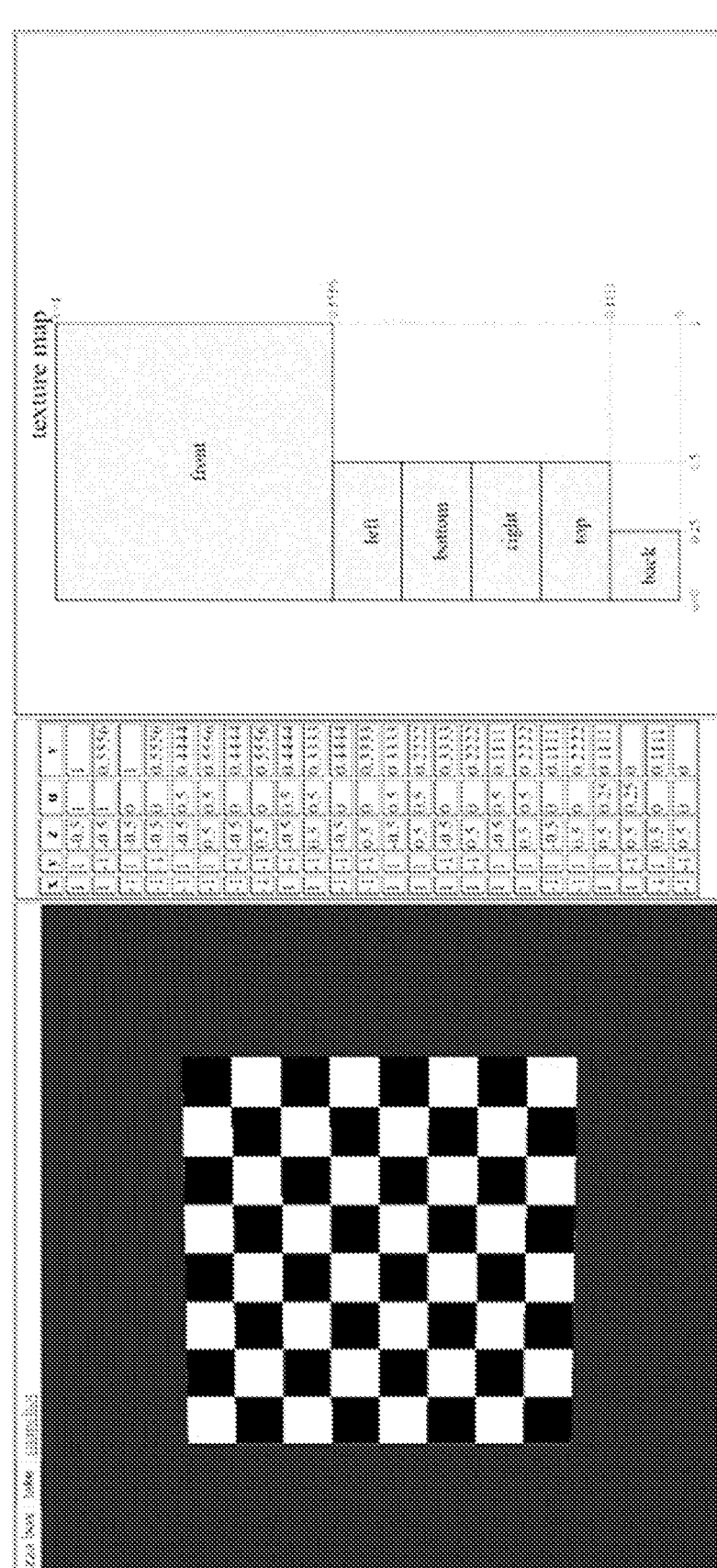

FIG. 14 is an illustration of the outside view of the front of the adaptive pizza box projection map. FIG. 15 is an illustration of the outside view of the back of the adaptive pizza box projection map. The box has been rotated so the checkerboard of the back is represented in FIG. 15.

Figure 16:
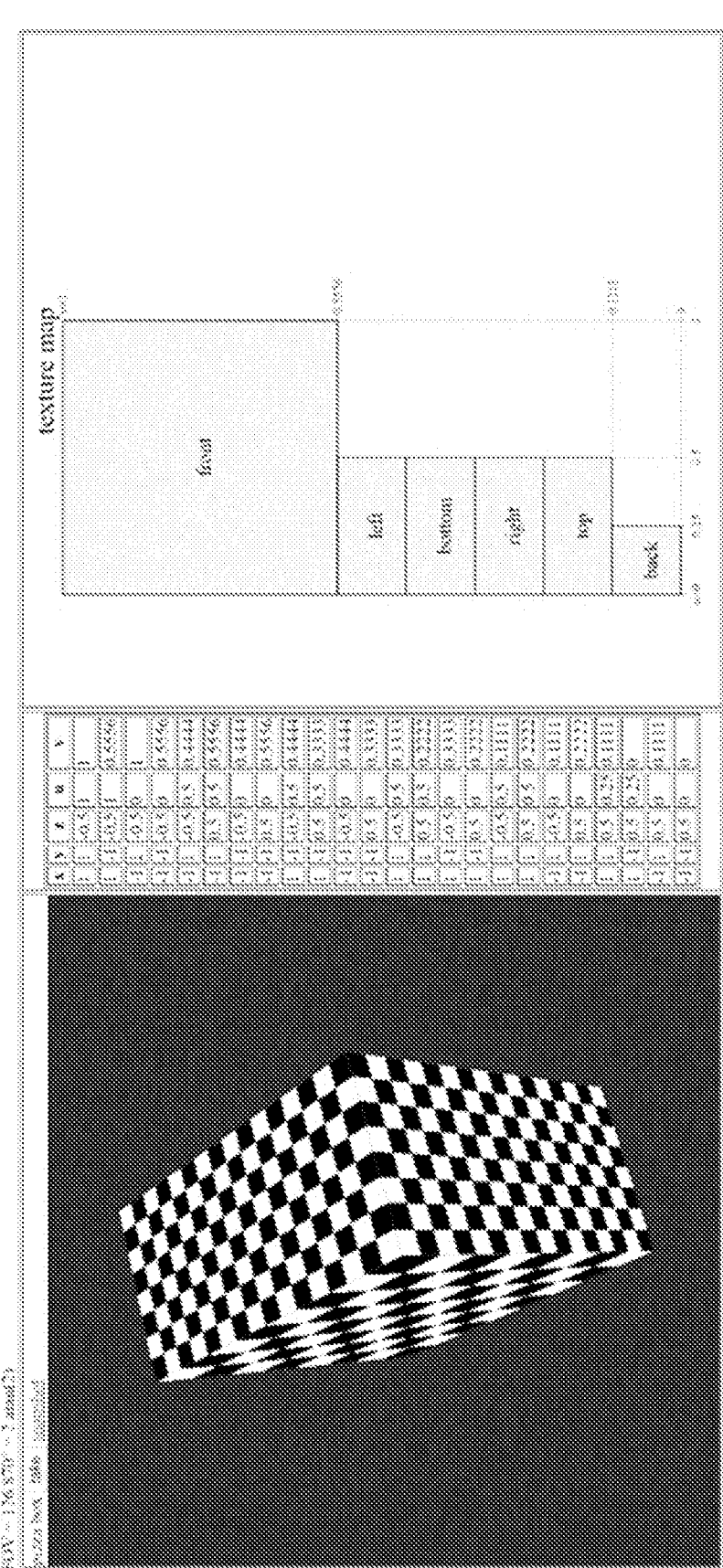

FIG. 16 is an illustration of the outside view of the top, back and right sides of the adaptive pizza box projection map. The box's pitch has been changed so the checkerboard of the top, right and back are represented in FIG. 16..

Figure 17:
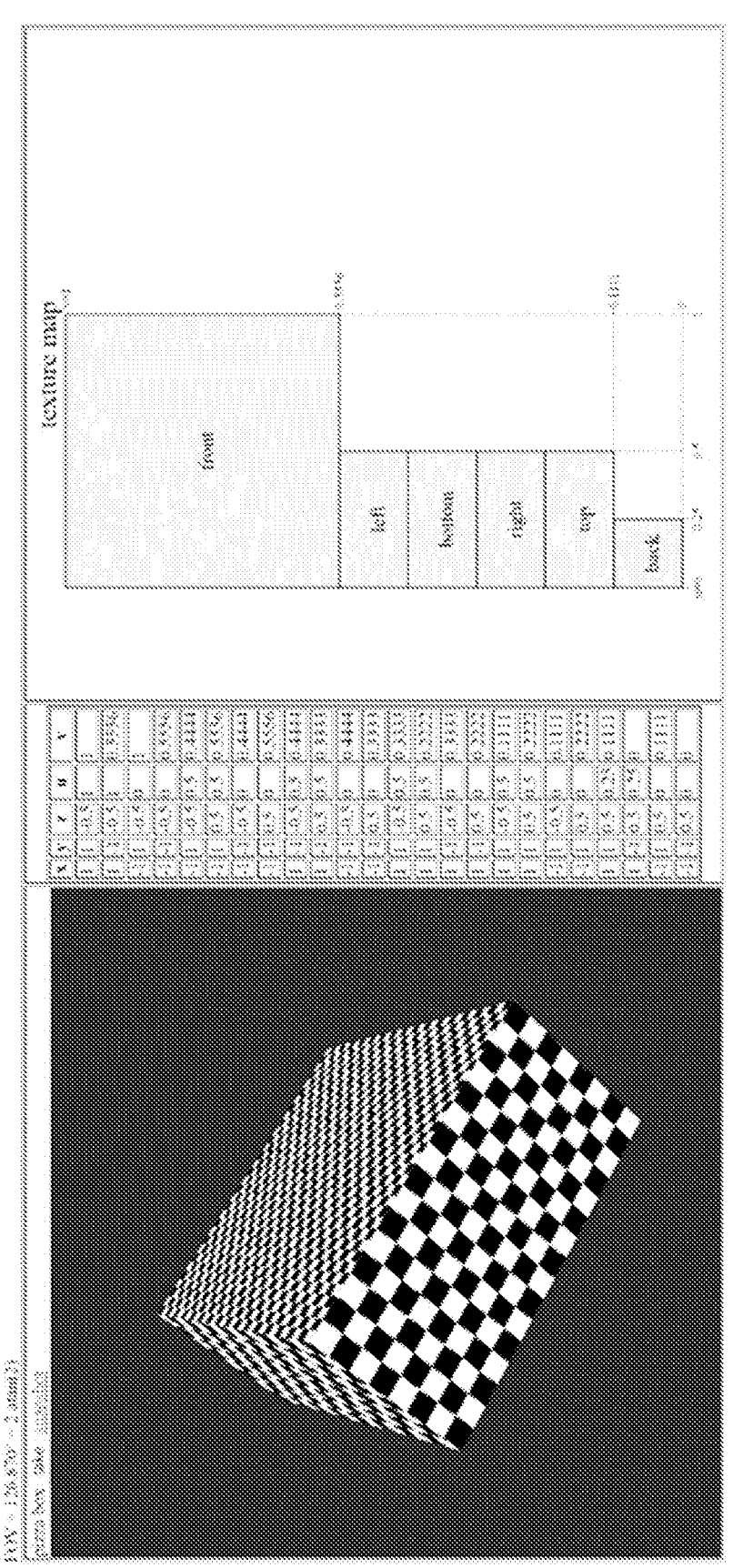

FIG. 17 is an illustration of the outside view of the top, front and right of the adaptive pizza box projection map. The box's pitch and rotation have been changed so the checkerboard of the top, right and front are represented in FIG. 17.

Figure 18:
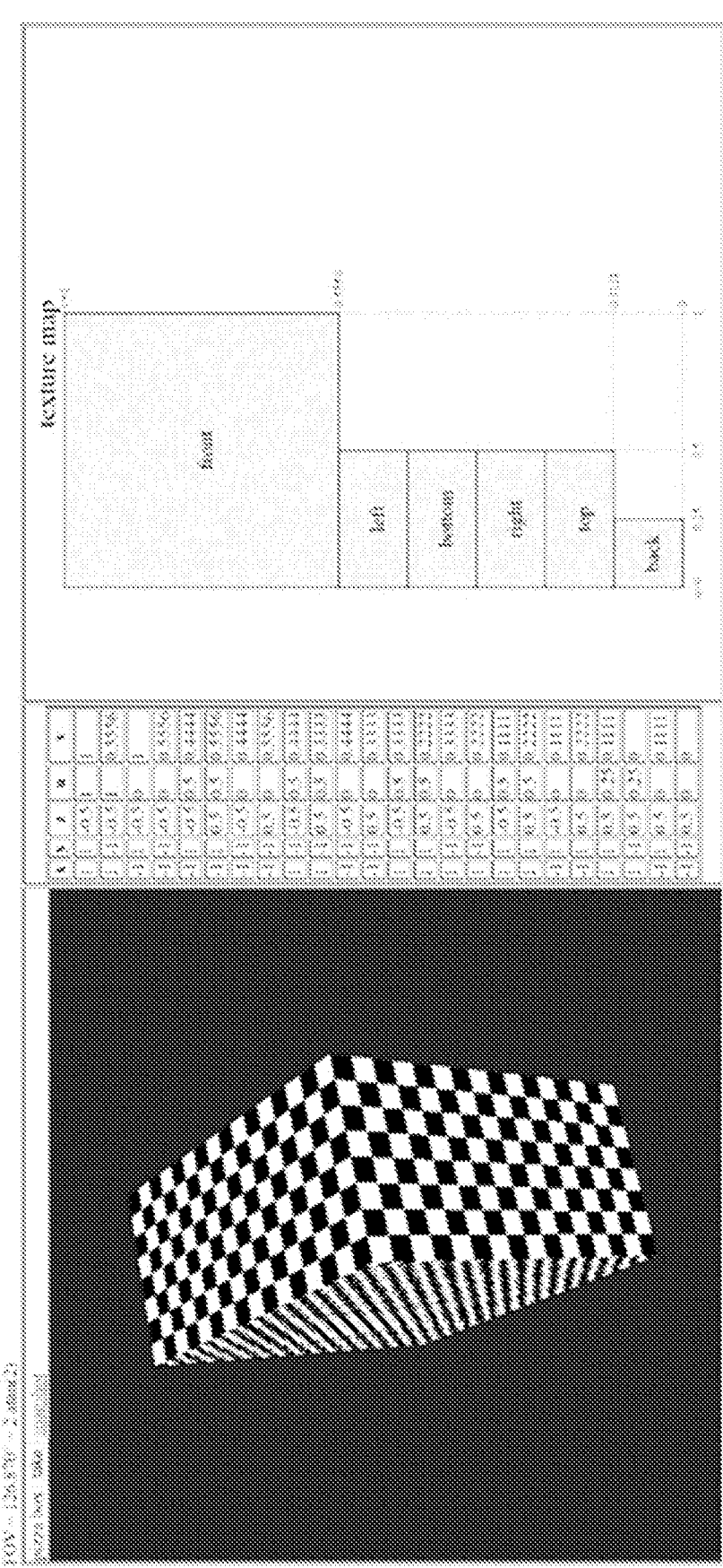

FIG. 18 is an illustration of the outside view of the bottom, left and front of the adaptive pizza box projection map. The box's pitch and rotation have been changed so the checkerboard of the bottom, left and front are represented in FIG. 18.

Other projection formats, or future defined projection formats, may be modified to work with an adaptive projection map according to some embodiments to provide a network optimized viewport QoE. For example, some embodiments may use a miniview mapping, such as mixed-scale miniviews with adaptation.

Figure 19:
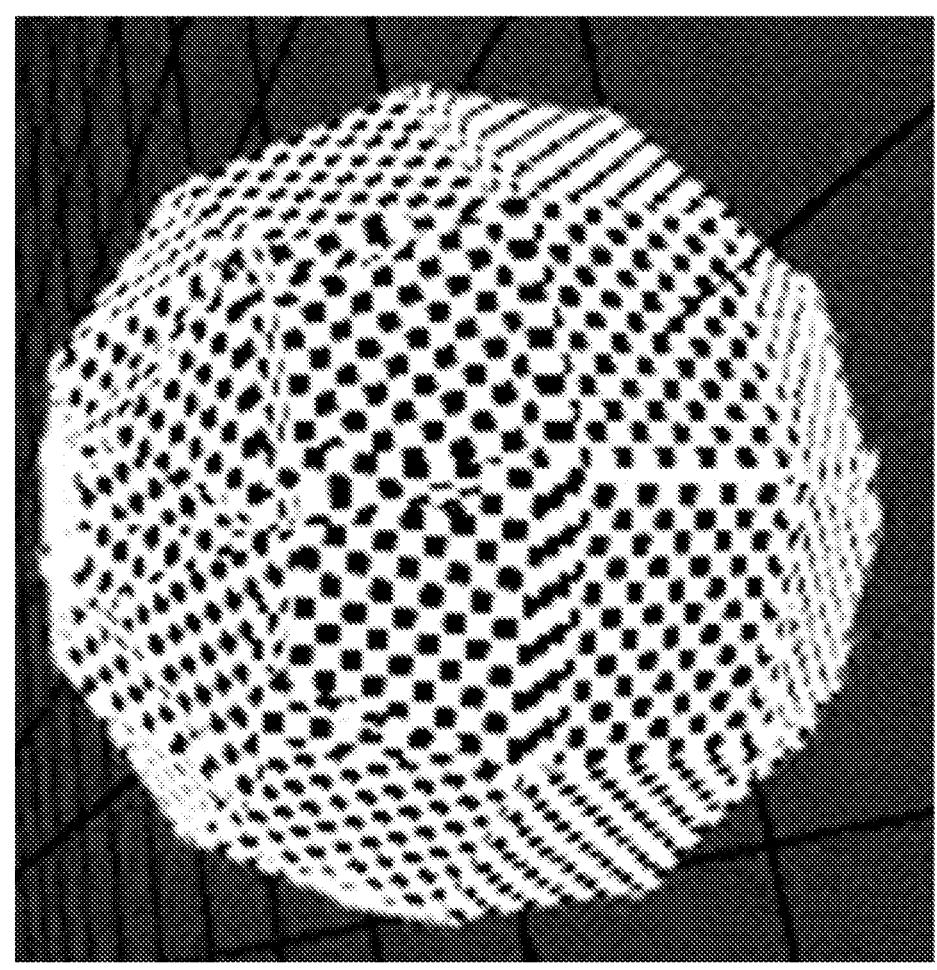
FIG. 19 is an example miniview projection map.

More information on miniviews may be found in "Mini-View Layout for Bandwidth-Efficient 360-Degree Video" by Mengbai Xiao, et al. FIG. 19 is a diagram of the miniview concept outlined in Mengbai et al.

The original concept was for 360 degree images and video and the goal was a somewhat uniform pixel density across the sphere. Equirectangular projection (ERP) is disappointing because its pixel density at the poles is extremely high and is therefore wasteful. Cubemap is slightly better, but the pixel density in the edges is higher than at the center of a panel, and even higher in the corners.

Mengbai et al addressed this by using many more panels than a cubemap. The miniview's pixel density in the corner where panels meet is higher than the center of a panel, but as the panels get smaller and more numerous, the disparity shrinks. Theoretically an implementation may use a million 9-pixel panels, but this is impractical.

Particular embodiments may apply gazed-based bandwidth and latency optimization to miniviews. Two approaches include panels with fixed pixel count, but variable field-of-view (FOV), or panels with fixed FOV, but variable pixel count.

For the variable FOV approach, the panels have a fixed pixel width and height but change how much of the field of view the panel covers. This means that the texture carrying the pixels can have a fixed layout and stable UV coordinates. To increase pixel density in the direction of the viewer's gaze, the pixels panels in that direction are shrunk, increasing their pixel density (same number of pixels in a smaller FOV increases the density/resolution of the image). The panels are shifted and resized to ensure there are no gaps in the projection. The panels behind the viewer may be enlarged to compensate and the pixel density/resolution of those panels may get worse (which is not a problem, because they probably will not be seen by the viewer unless the viewer turns their head faster than the remote rendering system can deliver an updated view).

A drawback of this solution is the complexity of the algorithm that calculates a miniview layout with changing panel FOVs that still covers the sphere.

Mengbai et al used a layout based on rings of latitude. It is assumed the equator would be aligned with the horizon, and the up/down poles would each have a single panel. However, one of the simpler algorithms for laying out variable-FOV panels is to place the poles of the miniview layout along the gaze axis (a dense small-FOV one in front, and a coarse large-FOV one behind) and have rings of decreasingly dense panels surrounding the gaze. The number of panels in the ring may vary as the pixel density gradient changes. Maintaining the same number of panels across varying pixel density gradients may require some non-trivial algorithms. Using variable-FOV panels where the gaze is along the equator may require even more advanced algorithms to ensure that there are no gaps.

An alternate approach is to use a fixed panel layout but alter how many pixels each panel has. Panels in the direction of the viewer's gaze have more pixels. Panels behind the viewer have fewer pixels. This keeps the xyz geometry stable, but the texture coordinates are in flux as the pixel density gradient changes.

Mengbai et al includes an example miniview layout placing 82 miniviews on a rectangular frame, which illustrates how the panels are laid out in the texture. When the server changes the pixel density gradient of the panels, the layout must change. A problem of deciding how to fit the panels into the texture is part of a larger family of problems referred to as packing problems (i.e., also referred to as different rectangles in a rectangle).

Complicating this is that the server wants to keep the resolution of the master texture fixed and ask the client to decode a video whose resolution changes over time complicates the client. A fixed-resolution packing algorithm may be best served by targeting a fixed aspect ratio with variable size, and then scaling the result of the algorithm to the fixed video size. Using such a scaling algorithm, an attempt to increase pixel density may result in a layout that demands more area and then gets scaled down resulting in a reduction of the pixel density of the front panel instead of an increase.

Another option is to use a larger texture that is never filled and has spare space. This texture may always have some blank spots that do not need to be encoded because their pixels are not part of a panel. However, there may be situations where an adjustment to the texture layout may cause macroblocks to be activated and increase the needed bandwidth in a situation where the server was trying to reduce bandwidth usage.

Figure 20:
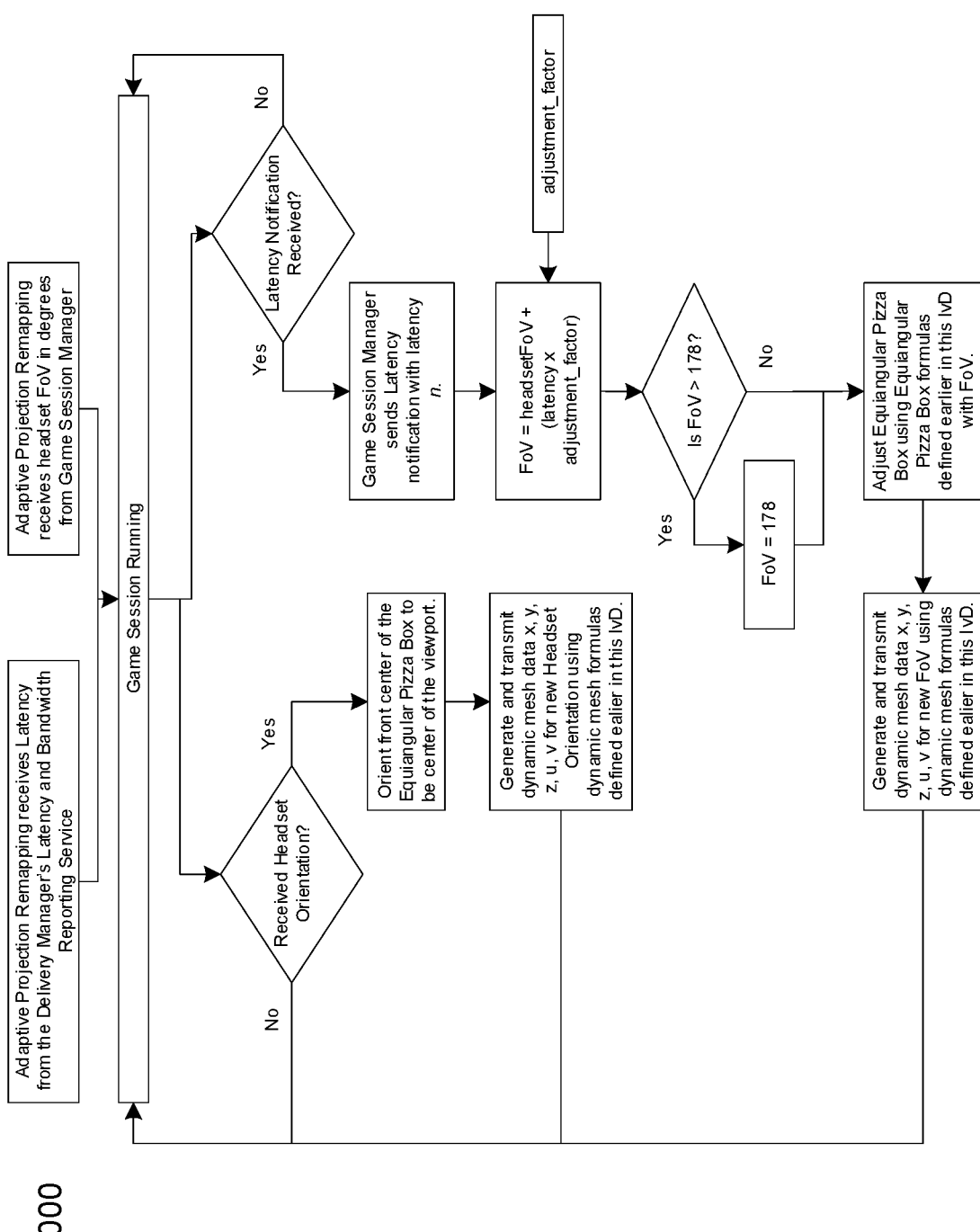
FIG. 20 is a flow diagram illustrating a method in the adaptive projection remapping subsystem during a virtual environment session, according to a particular embodiment.

FIG. 20 is a flow diagram illustrating a method in the adaptive projection remapping subsystem during a virtual environment session, according to a particular embodiment. The adaptive projection remapping subsystem may comprise adaptive projection remapping subsystem 22 described with respect to FIG. 1.

In general, particular embodiments rotate the pizza box based on headset orientation data and extends the high-quality area beyond the viewport based on latency. The adjustment factor is a value that can be tuned to adjust for latency and indicates how far to expand the field of vision past the headset based on a latency in milliseconds. Particular embodiments may determine how far to expand the high density area beyond the headset based on requirements of a particular virtual environment.

The illustrated example uses 0.9 as the adjustment factor and a headset with a 110 degree FOV. Thus, a 10 second latency increases the FOV to 119 degrees (110 degrees+10 ms×0.9=119 degrees), for example.

Figure 21:
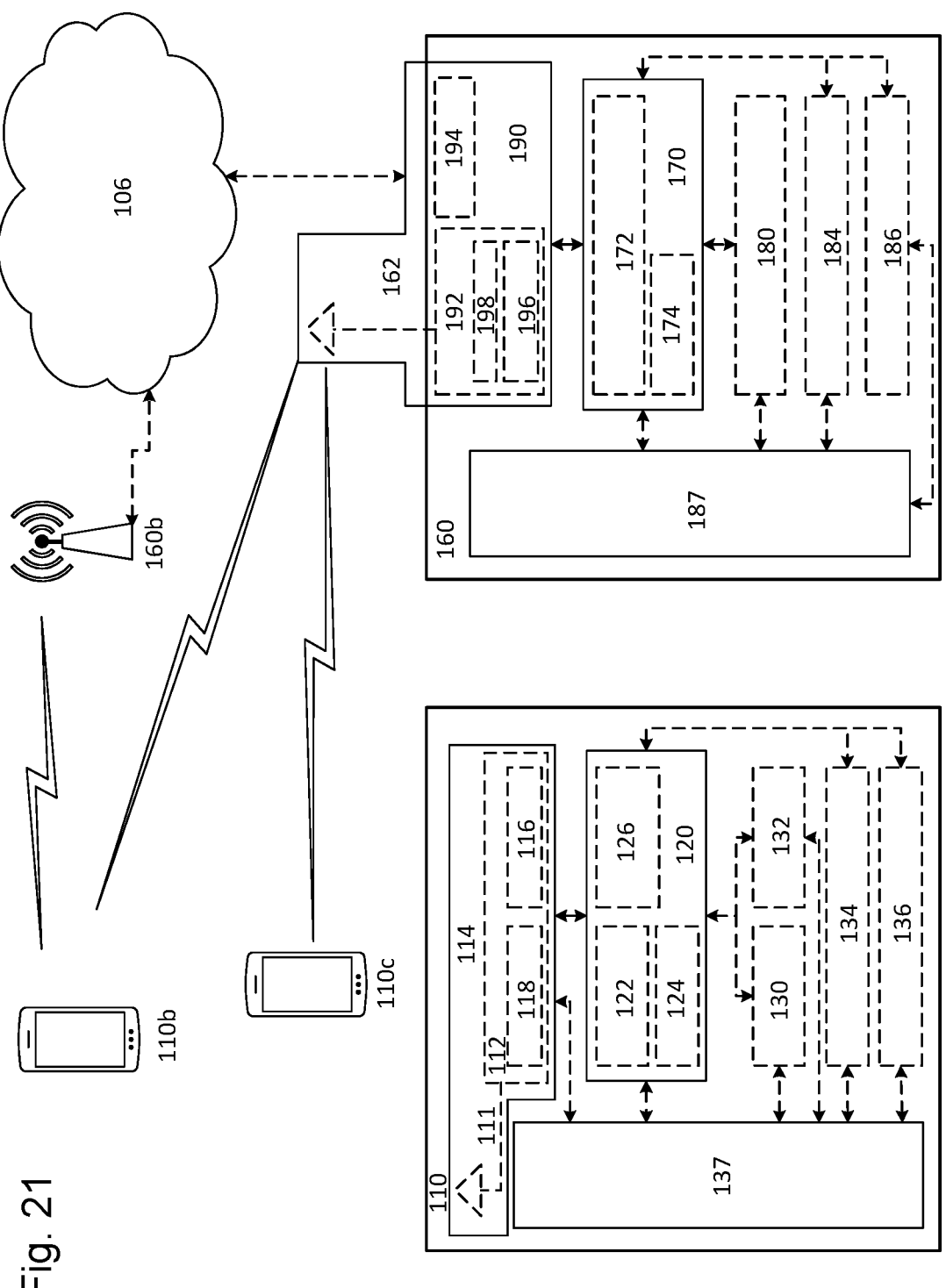
FIG. 21 is a block diagram illustrating an example wireless network.

FIG. 21 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. Network nodes may also include edge and/or cloud devices.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node 160 includes processing circuitry 170, device readable medium 180, interface 190, auxiliary equipment 184, power source 186, power circuitry 187, and antenna 162. Although network node 160 illustrated in the example wireless network of FIG. 21 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 21 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. A wireless device may also refer to a mobile terminal as part of an IAB node.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 21. For simplicity, the wireless network of FIG. 21 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

FIG. 9 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 9, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

FIG. 22 is a flowchart illustrating an example method performed by a virtual environment rendering engine for remote rendering of a virtual environment for a client device, according to certain embodiments. In particular embodiments, one or more steps of FIG. 22 may be performed by virtual environment rendering engine 11 described with respect to FIG. 1, or other appropriate functional nodes described therein (including any combination thereof).

The method begins at step 1012, where the virtual environment rendering engine receives an indication of network latency between the virtual environment rendering engine and the client device. For example, virtual environment rendering engine 11 may receive latency report 152 from wireless network 14, as illustrated in FIG. 1. Latency report 152 may indicate the latency between client device 12 and virtual environment rendering engine 11 through wireless network 14. If the latency changes, virtual environment rendering engine 11 may receive updates from wireless network 14.

At step 1014, the virtual environment rendering engine receiving an indication of a client viewport field of view for the client device. For example, virtual environment rendering engine 11 may receive headset orientation data 124 from client device 12. Virtual environment rendering engine 11 may also know the field of view in degrees for the user device. With the FOV and/or orientation information, virtual environment rendering engine 11 knows the viewport into the virtual environment.

At step 1016, based on the network latency, the virtual environment rendering engine determines an adjusted viewport field of view. For example, for increased latency, virtual environment rendering engine 11 may increase the viewport by an adjustment factor as described above at least with respect to FIGS. 1 and 23.

At step 1018, the virtual environment rendering engine generates a projection mapped 360 degree video frame. When the projection mapped 360 degree video frame is rendered in the virtual environment, a pixel density within the adjusted viewport field of view is greater than the pixel density outside the adjusted viewport field of view. For example, the adjustment of the viewport increases outside the range of the original viewport as the latency increases. Thus, the area of greater pixel density also increases. Accordingly, even if the user of client device 12 changes the headset orientation, the chances are still good that the user will view good resolution video.

In some embodiments, the projection mapped 360 degree video frame comprises an equiangular box comprising a front, back, top, bottom, and two sides, and the method further comprises orienting the front of the equiangular box with the client viewport field of view for the client device. The pixel density of the front of the equiangular box may greater than the pixel density of each of the top, bottom, two sides, and back of the equiangular box. For example, virtual environment rendering engine 11 may generate the projection mapped 360 degree video frame using any of the pizza box projection embodiments and examples described herein.

At step 1020, the virtual environment rendering engine may generate dynamic mesh data for the projection mapped 360 degree video frame. For example, virtual environment rendering engine 11 may generate dynamic mesh data 118 as described with respect to at least FIG. 1.

At step 1022, the virtual environment rendering engine encodes the projection mapped 360 degree video frame and at step 1024 transmits the encoded projection mapped 360 degree video frame and/or dynamic mesh data to the client device. For example, virtual environment rendering engine 11 may transmit the encoded projection mapped 360 degree video frame and/or dynamic mesh data to client device 12.

Modifications, additions, or omissions may be made to method 1000 of FIG. 22. Additionally, one or more steps in the method of FIG. 22 may be performed in parallel or in any suitable order.

FIG. 23 is a flowchart illustrating an example method in a virtual environment rendering support node for supporting a network-managed remotely rendered game session, according to certain embodiments. In particular embodiments, one or more steps of FIG. 23 may be performed by delivery manager 16 and/or session manager 18 described with respect to FIG. 1, or other appropriate functional nodes described therein (including any combination thereof).

The method begins at step 1112, where the virtual environment rendering support node requests, prior to establishing or during a network-managed remotely rendered game session for display on a client device, an indication of the latency and bandwidth associated with the client device. For example, delivery manager 16 and/or session manager 18 may request latency report 152 and/or bandwidth report 154 from wireless network 14, as illustrated in FIG. 1.

At step 1114, the virtual environment rendering support node receives, from a network node, the indication of the latency and bandwidth associated with the client device. For example, delivery manager 16 and/or session manager 18 may receive latency report 152 and/or bandwidth report 154 from wireless network 14, as illustrated in FIG. 1. Delivery manager 16 and/or session manager 18 may receive the reports from a network node, such as network node 160 described with respect to FIG. 21, a network edge node, a networked managed node, or the like. Latency report 152 and/or bandwidth report 154 may indicate the latency and/or bandwidth between client device 12 and virtual environment rendering engine 11 through wireless network 14. If the latency and/or bandwidth changes, delivery manager 16 and/or session manager 18 may receive updates from wireless network 14.

At step 1116, the virtual environment rendering support node determines, based on the latency and bandwidth associated with the client device, one or more settings for the network-managed remotely rendered game session. For example, delivery manager 16 and/or session manager 18 may determines settings such as encoding parameters, framerate, resolution, and field of view according to any of the embodiments and examples described herein, such as those described with respect to FIGS. 1 and 2.

At step 1118, the virtual environment rendering support node applies the one or more settings to the network-managed remotely rendered game session. For example, delivery manager 16 and/or session manager 18 may share the setting with session engine 26, client device 12, or any other suitable component described with respect to FIGS. 1 and 2.

At step 1120, the virtual environment rendering support node determine at least one of the determined bandwidth and latency has changed and applies the updated one or more settings to the network-managed remotely rendered game session, according to any of the embodiments and examples described herein.

Modifications, additions, or omissions may be made to method 1100 of FIG. 23. Additionally, one or more steps in the method of FIG. 23 may be performed in parallel or in any suitable order.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a virtual environment rendering engine for remote rendering of a virtual environment for a client device, the method comprising:

receiving an indication of network latency between the virtual environment rendering engine and the client device;

receiving an indication of a client viewport field of view for the client device;

based on the network latency, determining an adjusted viewport field of view;

generating a projection mapped 360 degree video frame, wherein the projection mapped 360 degree video frame is rendered in the virtual environment, wherein a pixel density within the adjusted viewport field of view is greater than a pixel density outside the adjusted viewport field of view, and wherein the adjusted viewport field of view increases in dimension as the network latency increases;

encoding the projection mapped 360 degree video frame; and transmitting the encoded projection mapped 360 degree video frame to the client device.

2. The method of claim 1, further comprising:

generating dynamic mesh data for the projection mapped 360 degree video frame; and transmitting the dynamic mesh data to the client device.

3. The method of claim 1, wherein the projection mapped 360 degree video frame comprises an equiangular box comprising a front, back, top, bottom, and two sides, and the method further comprises orienting the front of the equiangular box with the client viewport field of view for the client device.

4. The method of claim 3, wherein a pixel density of the front of the equiangular box is greater than a pixel density of each of the top, bottom, two sides, and back of the equiangular box.

5. The method of claim 1, wherein the virtual environment rendering engine comprises a game rendering engine and the client device comprises one or more of a virtual reality headset and a video display screen.

6. The method of claim 1, wherein the network between the virtual environment rendering engine and the client device comprises a fifth generation (5G) wireless network, and the indication of network latency is received from a 5G network node.

7. A virtual environment rendering engine comprising processing circuitry operable to:

receive an indication of network latency between the virtual environment rendering engine and a client device;

receive an indication of a client viewport field of view for the client device;

based on the network latency, determine an adjusted viewport field of view;

generate a projection mapped 360 degree video frame, wherein the projection mapped 360 degree video frame is rendered in the virtual environment, wherein a pixel density within the adjusted viewport field of view is greater than a pixel density outside the adjusted viewport field of view, wherein the adjusted viewport field of view increases in dimension as the network latency increases;

encode the projection mapped 360 degree video frame; and transmit the encoded projection mapped 360 degree video frame to the client device.

8. The virtual environment rendering engine of claim 7, the processing circuitry further operable to:

generate dynamic mesh data for the projection mapped 360 degree video frame; and transmit the dynamic mesh data to the client device.

9. The virtual environment rendering engine of claim 7, wherein the projection mapped 360 degree video frame comprises an equiangular box comprising a front, back, top, bottom, and two sides, and the processing circuitry is further operable to orient the front of the equiangular box with the client viewport field of view for the client device.

10. The virtual environment rendering engine of claim 9, wherein a pixel density of the front of the equiangular box is greater than a pixel density of each of the top, bottom, two sides, and back of the equiangular box.

11. The virtual environment rendering engine of claim 7, wherein the virtual environment rendering engine comprises a game rendering engine and the client device comprises one or more of a virtual reality headset and a video display screen.

12. The virtual environment rendering engine of claim 7, wherein the network between the virtual environment rendering engine and the client device comprises a fifth generation (5G) wireless network, and the indication of network latency is received from a 5G network node.

\* \* \* \* \*